United States Patent
Giese et al.

(10) Patent No.: US 7,891,454 B2
(45) Date of Patent: Feb. 22, 2011

(54) SNOWMOBILE FRAME ASSEMBLY

(75) Inventors: Timothy James Giese, Roseau, MN (US); Gustavo Augusto Aramayo, II, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 538 days.

(21) Appl. No.: 11/623,873

(22) Filed: Jan. 17, 2007

(65) Prior Publication Data

US 2007/0199753 A1  Aug. 30, 2007

Related U.S. Application Data

(60) Provisional application No. 60/776,467, filed on Feb. 24, 2006.

(51) Int. Cl.
*B62M 27/02* (2006.01)
(52) U.S. Cl. .................... 180/193; 180/9.56
(58) Field of Classification Search ............ 180/193, 180/190, 9.1, 9.5, 9.54, 9.56, 9.52
See application file for complete search history.

(56) References Cited

U.S. PATENT DOCUMENTS

| | | | |
|---|---|---|---|
| 3,840,082 A | 10/1974 | Olson | |
| 3,933,213 A | 1/1976 | Trowbridge | |
| 4,442,913 A * | 4/1984 | Grinde | 180/190 |
| 4,502,560 A * | 3/1985 | Hisatomi | 180/190 |
| 4,917,207 A | 4/1990 | Yasui et al. | |
| 4,987,965 A | 1/1991 | Bourret | |
| 5,370,198 A | 12/1994 | Karpik | |
| 5,692,759 A | 12/1997 | Flynn | |
| 5,727,643 A | 3/1998 | Kawano et al. | |
| 5,860,486 A | 1/1999 | Boivin et al. | |
| 5,947,217 A * | 9/1999 | Snare et al. | 180/9.56 |
| 6,161,908 A | 12/2000 | Takayama et al. | |
| 6,321,864 B1 * | 11/2001 | Forbes | 180/193 |
| 6,390,219 B1 | 5/2002 | Vaisanen | |
| RE38,124 E | 5/2003 | Mallette et al. | |
| 6,595,309 B1 | 7/2003 | Savage et al. | |
| 6,626,258 B1 * | 9/2003 | Forbes | 180/184 |
| 6,755,271 B1 | 6/2004 | Berg | |

(Continued)

FOREIGN PATENT DOCUMENTS

CA  2 561 337 A1  9/1999

(Continued)

OTHER PUBLICATIONS

International Search Report and Written Opinion for PCT/US2007/004895 issued by the European Patent Office on Nov. 6, 2007.

*Primary Examiner*—Kevin Hurley
(74) *Attorney, Agent, or Firm*—Baker & Daniels LLP

(57) ABSTRACT

A snowmobile rear suspension is shown comprised of a linear force element (LFE) positioned outside the envelope of the snowmobile endless track. The snowmobile frame includes a chassis mounted to a tunnel, where the chassis includes a central mounting bracket. The LFE is attached at one end to the bracket and at the other end to a bell crank. The bell crank is operatively connected to the slide rails. When the slide rails collapse in normal operation, the bell crank strokes the LFE, and the suspension is progressive throughout the range.

26 Claims, 25 Drawing Sheets

U.S. PATENT DOCUMENTS

| | | |
|---|---|---|
| 6,926,108 B1 | 8/2005 | Polakowski et al. |
| 6,942,050 B1 | 9/2005 | Honkala et al. |
| 7,040,426 B1 * | 5/2006 | Berg .......................... 180/9.5 |
| 2005/0205320 A1 | 9/2005 | Girouard et al. |

FOREIGN PATENT DOCUMENTS

| | | |
|---|---|---|
| WO | WO 02/087975 A | 11/2002 |

* cited by examiner

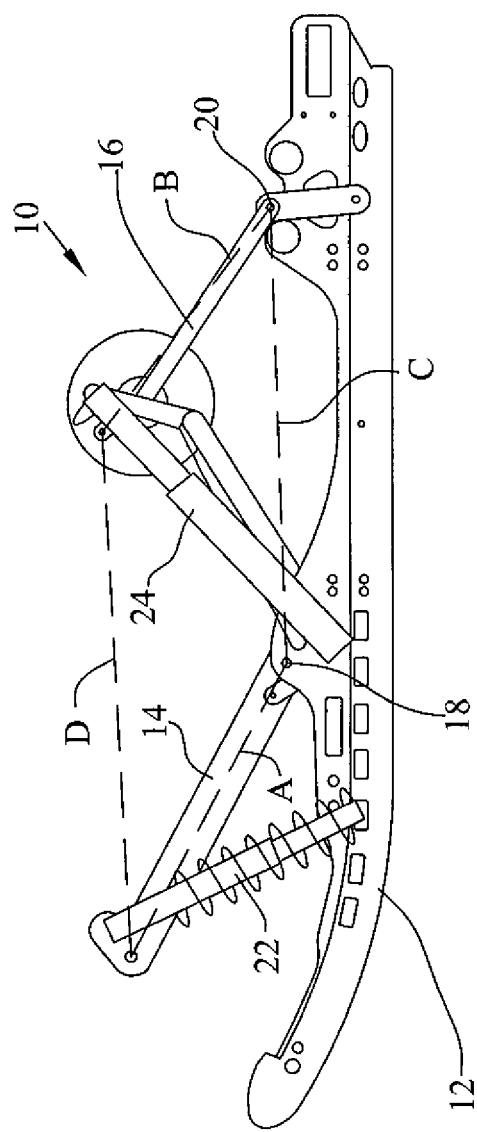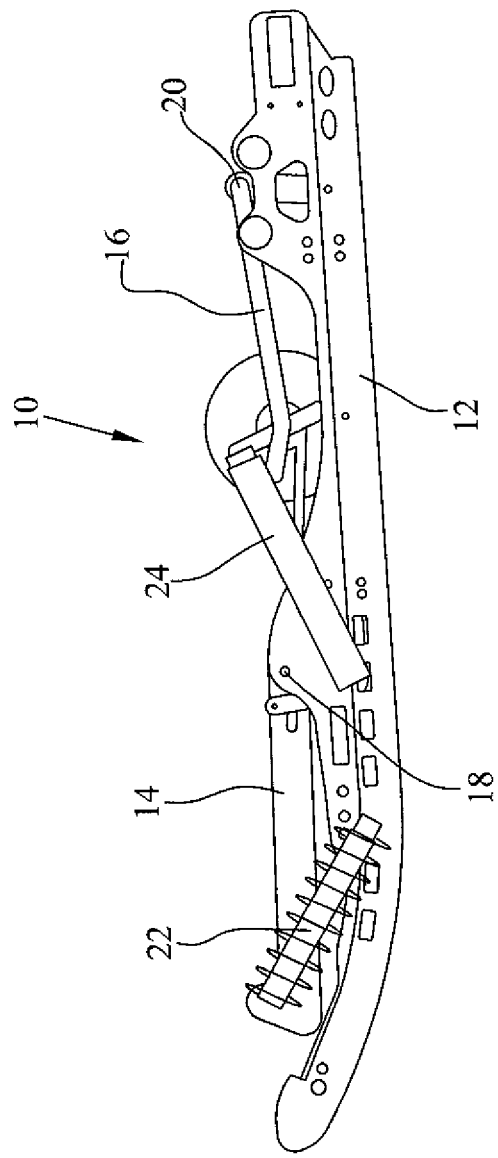
FIG. 1
FIG. 2

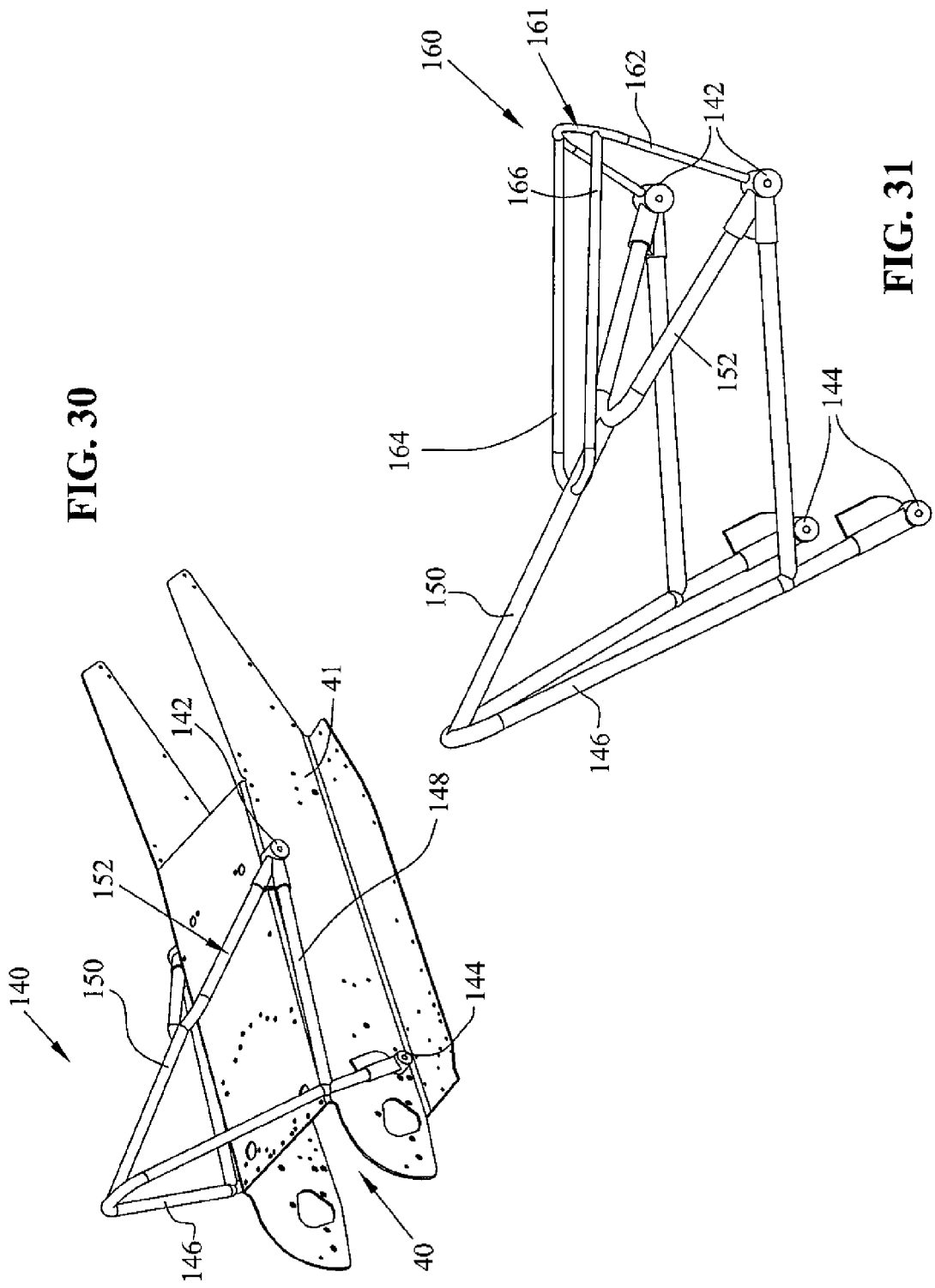

SNOWMOBILE FRAME ASSEMBLY

This application claims priority from provisional patent application Ser. No. 60/776,467 filed Feb. 24, 2006, the disclosure of which is fully incorporated herein by reference.

BACKGROUND OF THE INVENTION

The present invention relates to snowmobiles, and more particularly, the present invention relates to a frame assembly for snowmobiles.

Performance characteristics of snowmobiles, including the comfort of the ride, depend on a variety of systems and components, including the snowmobile suspension. Typically, a snowmobile suspension includes two systems, a front suspension system for a pair of skis and a rear suspension system for the track.

The rear suspension of a snowmobile supports an endless track driven by the snowmobile engine to propel the machine. The track is supported beneath a vehicle chassis by a suspension that is designed to provide a comfortable ride and to help absorb the shock of the snowmobile crossing uneven terrain. Most modern snowmobiles use a slide rail suspension which incorporates a pair of slide rails along with several idler wheels to support the track in its configuration. The slide rails are typically suspended beneath the chassis by a pair of suspension arms, with each arm being attached at its upper end to the chassis of the snowmobile, and at its lower end to the slide rails. The mechanical linkage of the slide rails to the suspension arms and to the snowmobile chassis typically is provided by springs and at least one element acting along a linear path, such as a shock absorber, damper, air shock, shock and spring combination, or other linear force element (LFE). The springs are loaded to bias the slide rails downwardly away from the snowmobile chassis and the shock absorbers; dampers or LFEs provide damping forces for ride comfort.

There are presently two general types of snowmobile rear suspensions in all of the snowmobile industry: coupled and uncoupled. The term "coupled" is given to suspensions that have dependant kinematics front-to-rear and/or rear-to-front (relative to the rear suspension rail beam). That is, a suspension is coupled "front-to-rear" when the front of the suspension is deflected vertically and the rear also moves vertically to some degree. A suspension is coupled "rear-to-front" when the rear of the suspension is deflected vertically and the front also moves vertically to some degree. A suspension is considered to be coupled "tighter" front-to-rear, or increased coupling bias to the front, if a front deflection causes near the same rear deflection. The same is true if a suspension is coupled "tighter" rear-to-front, or increased coupling bias to the rear: a rear deflection causes near the same front deflection. An uncoupled rear suspension functions independently front-to-rear and rear-to-front. A deflection of the front portion of the suspension causes little to no deflection of the rear portion and vice versa.

There are two main advantages to a coupled suspension. First, a coupled suspension shares rate when coupled. There is a distinct rate associated with the front of the suspension and a separate distinct rate associated with the rear of the suspension; when a suspension "couples" it borrows the rate of both the front and rear of the suspension so the overall rate becomes higher than could have been achieved without coupling. Second, coupling is used to control weight transfer during acceleration. An uncoupled suspension will allow excessive chassis pitch due to the independence of the suspension. Coupling stops this by limiting the angle of the slide rail and by increasing the rate of the suspension and "locking" the suspension geometry.

Typically the use of a coupled suspension, uncoupled suspension, and the degree to which a suspension is coupled depends on the expected use. Coupled suspensions are mostly used on trail/performance snowmobiles where large bumps and tight corners require increased rate and controllable weight transfer. Uncoupled suspensions are used on deep snow/long track snowmobiles where weight transfer and traction are more important.

There are many ways to create a coupled rear suspension. The simplest form of a rear suspension is a four-link suspension created by the chassis, two arms, and the slide rails all connected with rotational pivots. This type of suspension yields only one degree of freedom. The slide rail motion and suspension kinematics are predefined by the length of the 4 links and cannot be altered due to the location of the input (front, rear, or between). This is not desirable because the slide rail will not follow undulating terrain or allow any angle change relative to the chassis due to acceleration. To fix this problem with a basic four-link, one of the links is allowed to change length to some degree. The geometry of the four-link therefore changes relative to the location of the input. A deflection of the front portion of the suspension yields one distinct four-link geometry and a deflection of the rear portion of the suspension yields different distinct four-link geometry. There is always some degree of uncoupled behavior in a coupled suspension when the geometry is not locked front-to-rear or rear-to-front. It is important to note that most coupling is focused on rear-to-front to help control excessive weight transfer. The majority of differences in rear suspension architecture are driven by accomplishing this same goal of a "sloppy" four-link in different ways.

FIG. 1 illustrates an example of a traditional rear suspension 10 (illustratively a 2D model of the Polaris Fusion® snowmobile rear suspension design) having slide rails 12, a front suspension arm 14 and a rear suspension arm 16. Front suspension arm 14 is coupled to the slide rails 12 by pivot connection 18. An opposite end of front suspension arm 14 is pivotably coupled to the chassis. Rear suspension arm 16 is pivotably coupled to the slide rails 12 by pivot connection 20. An opposite end of the rear suspension arm 16 is pivotably coupled to the chassis. Torsion springs are illustratively mounted between the rear torque arm and slide rails 12. First and second linear force elements (LFE) 22 and 24 are coupled between the first and second suspension arms 14 and 16, respectively and the slide rails 12 in a conventional manner.

FIG. 1 labels the following geometry of a four bar link which is similar in most snowmobile rear suspensions as illustrated by the lines defining: A) Front Link, B) Rear Link, C) Rail Link, and D) Chassis Link. These links and their relative lengths govern the majority of rear suspension kinematics.

The coupling bias behavior as described above is dependant on this four-link geometry and is important to rear suspension rate, impact harshness, and ride quality. For example, a perfectly symmetric four-link (A=B and C=D, A parallel to B and C parallel to D) will yield a rail angle that is maintained at the same angle throughout travel. In other words, the rail 12 does not rotate relative to the chassis as the suspension is compressed. This type of movement is not desirable due to the need to achieve traction on undulating terrain. As deviations to this symmetric geometry are made, the rail angle will change throughout suspension travel.

As traditional suspensions are compressed, the front arm begins to "point" at the rear arm mount location. This is known as "over centering". FIGS. 2 and 3 illustrate this graphically, showing how links A and C have become substantially a straight line.

A rear suspension that is coupled rear-to-front has the same over-centering problems as discussed above for a front load situation, but to a larger degree. FIG. 4 illustrates this problem graphically when a rear load is applied as illustrated by arrow 27, showing how link B has crossed over link C. As mentioned above, over-centering drastically reduces effective suspension rate and damper velocities.

Simply moving the rear point of a conventional suspension upward is not feasible. The rear arm needs to become significantly shorter than the front. Typical link ratios (A/B) on conventional suspensions are between 1 to 1.5. Ratios other than this are not feasible or do not package in current design envelopes. However, to accommodate a higher rear mount, A/B ratios need to increase to the range of about 1.6 to 2.0. Therefore, in an illustrated embodiment, A/B ratios are preferably 1.6 to 2.0 or greater in coupled suspensions. FIG. 6 illustrates the difference in a rear load case coupling angle between a conventional suspension labeled as "Prior Art" (illustratively the Polaris IQ 440 suspension) and the illustrated embodiment described below (labeled as "Improved Rear Suspension Coupled" and "Improved Rear Suspension Uncoupled").

FIG. 7 illustrates the difference in the coupling angle between a conventional suspension and the suspension of the present improved suspension invention described below. Conventional suspensions yield a front coupling angle that increases through travel. This means that as the conventional suspension is compressed, the angle of the slide rail increases. This type of behavior is not ideal because as the rail angle increases, rate and damper velocities decrease ultimately resulting in a regressive suspension. More desirable is a rail angle that decreases as the suspension is compressed; thus, effectively making the suspension rate progressive (the more regressive the rail angle, the more progressive the rate). However, an increasing coupling angle is difficult to eliminate due to the packaging of a traditional snowmobile suspension. In the illustrated embodiment of the present invention, unconventional packaging of the suspension components results in a vertical difference between the front arm and rear arm chassis mounts of preferably 20% or more of the chassis link length (D) which results in a decreasing coupling angle.

Further examination of coupling behavior yields two constraints necessary to maintain reasonable component loads and basic function of the rail/ground interface. First, this angle should be positive. In other words, when a load is applied to the front of the suspension as illustrated by arrow 25 in FIG. 3, the front portion of the slide rails 12 moves more than the rear portion and vice versa for a load applied to the rear of the suspension. Second, there should be no inflections, or change in sign of the slope, in the curve of rail angle versus vertical deflection, as shown in FIGS. 6 and 7. In other words, when a load is applied to the front of the suspension, at no point should the rear of the suspension begin to move faster than the front and vice versa for a load applied to the rear of the suspension.

Because an uncoupled suspension does not form a distinct four-link, no over-centering can occur. No link ratio is then necessary for a rear load case in an uncoupled suspension. This is very beneficial, but excessive vehicle pitch and lack of vertical rate usually make uncoupled suspensions behave poorly for load carrying capacity and ride quality. Typically, for these suspensions a link ratio is then tuned only for the front load case. The shock/spring ratio can be tuned to help counteract the deficiencies of an uncoupled suspension. In this way, the rear arm geometry is tuned exclusively to maximize rear load case rate. Therefore, linkage arm length ratios are tuned for front coupling and rear rate in uncoupled suspensions.

As discussed above, the majority of snowmobile rear suspension architectures utilize a combination of springs, dampers, or other similar linear force elements (LFE), all packaged within the envelope of the track. Regardless of how these elements are packaged, these designs typically use two methods to generate vertical rate: 1) the LFE is located so that there is some vertical component reacted between the suspension arm and rail beam, and 2) the LFE is connected to the suspension arm such that a torque reaction is generated about the upper pivot. The inherent problem is that these designs lose rate near full jounce due to the suspension mechanism components becoming generally planer. That is, all the suspension components fold down until they are lying relatively flat as the suspension components move at full jounce. This is due to the large vertical travel requirements of a snowmobile suspension.

The result of the suspension components becoming planar is that the load vector of the LFEs begins to point horizontally instead of vertically. This transfers load into the internal components of the suspension and does not react vertically to suspend the vehicle. Also, as the suspension components become planar, the moment arm through which the suspension reacts increases at a faster rate than can be controlled by the shock/spring ratio, regardless of the type of linkage used to accelerate the shock/spring.

With reference again to FIGS. 1 and 2, FIG. 1 shows a 2D representation of suspension 10 at full rebound. FIG. 2 shows suspension 10 at full jounce. The front and rear LFEs 22, 24 become generally planar and lay down and point nearly horizontally in FIG. 2. The rear torque arms get "longer" measured from the upper pivot to lower pivot in the horizontal direction. Even with a complicated linkage to help stroke the rear LFE 24, a progressive rate cannot be maintained due to the two reasons listed above. This is true for all conventional snowmobile rear suspension systems.

Load at the slide rails and, more importantly, the bias between front and rear load is directly related to coupling, especially for a front load case. Consider the traditional suspension as illustrated in FIG. 1. The architecture is such that the front spring/damper 22 acts between the front arm 14 and the slide rail 12, and both the torsion springs and rear damper 24 act between the rear arm 16 and the slide rail 12 near the front. Therefore, during a front load case, both springs and dampers 22, 24 have a large effect on load and rate. The same is true of a rear load case. Attempting to tune the front LFE 22 will change the load/rate at the front and rear, and vice versa. Also if the coupling were increased, the rail angle decreases through travel and the rate will increase. In order to tune the suspension rate, the front LFE 22, rear LFE 24 and torsion springs, and coupling angle all need to be adjusted.

To improve this system: 1) Front coupling can be used primarily to control front load/rate, 2) Front preload is adjusted by a small LFE near the front of the rail (has a very small affect on rate), and 3) rear preload and rate is determined by the rear arm only. To achieve this with actual architecture, the main rear LFE needs to react only at the rear arm and with no other suspension components. Therefore reacting the LFE on the chassis in the above discussion is important not only for progressive rate, but also for load bias. When these three conditions are true, rear coupling does not greatly influence rate. This is realized because the front LFE is only used for preload so there is generally very little rate to "borrow" from the front of the rail during a rear load case.

Progressive rate suspensions have not yet been achieved in snowmobile rear suspension designs because 1) the vertical component of the LFE becomes very small as the LFEs become horizontal and planar with the suspension during jounce, and 2) the rotational component of the LFE about the arm pivot also cannot increase faster than the increase in arm length moment.

The state of snowmobile rear suspensions in the industry consists entirely of falling rate, or regressive suspension designs. Even though there is a large variety in the suspension architecture from one manufacture to another, commercially available designs yield an overall suspension stiffness that decreases as the suspension is compressed toward full jounce. Some architectures yield discontinuities that may locally spike the rate for a short time (such as an overload spring), but afterwards the rate continues to decrease. Because most design effort is directed at optimizing a damper or spring motion ratio instead of analyzing the entire suspension system there are currently no progressive rate suspensions in the industry.

Now with regard to chassis construction, traditional snowmobile chassis structures consist of elements common to each manufacturer, especially in the tunnel and rear suspension portion of the snowmobile. Typically, the rear suspension includes two suspension arms attached to the chassis tunnel frame and a drive shaft mounted forward of the front arm to drive the endless track.

This conventional suspension arrangement poses two problems. First, track tension through suspension travel relies on the relative placement of the suspension arms and wheels to the drive shaft. Suspension mount locations are often determined not only by specific, desired suspension characteristics, but also on track tension packaging. Problems are encountered from both an over and under tensioning track standpoint. Second, the front arm placement is limited to remain outside the drive sprocket diameter due to interference with drive train components. This creates problems when attempting to change the weight transfer behavior of the rear suspension, which is dominated by front arm mount location.

Achieving the mount points for desirable rate and kinematics is only half the challenge of snowmobile suspension design. Packaging a track around the suspension is the other. Traditional suspensions sacrifice more optimum suspension geometry to provide track tensioning and packaging which can be extremely difficult to manage.

All of these problems are solved by mounting the front swing arm coaxial with the drive shaft as discussed below. Because the front swing arm rotates around the same axis as the track drive sprocket, track tension is only influenced by the slide rail approach bend profile and a rear suspension idler pulley. Also, the coaxial placement of the arm creates improved weight transfer behavior of the rear suspension.

In order to generate necessary traction under acceleration, weight transfer and pitch need to be considered. Suspension parameters are tuned to facilitate the shift of vehicle weight from the skis to the track. This shift in weight is imperative for snowmobile acceleration due to slippery ground conditions. There are many parameters, but the two that dominate are front arm mount locations and carrier wheel.

Vehicle pitch is partially a result of this weight shift, but excessive pitch can result without increased traction. Packaging constraints, such as track carrier wheels, within the design of the suspension may limit or increase the ability of the vehicle to pitch.

With this design, the improved suspension may eliminate the carrier wheel. This changes the load vector into the suspension from the track due to tractive forces between the track and ground. In the illustrated embodiment, the load vector from the track is more horizontal which induces less pitch and weight transfer than a traditional suspension. To improve this, the front arm is moved significantly forward to facilitate weight transfer. This point can move forward incrementally until it encounters the drive wheel inscribed circle. At this point, it can only move coaxial with the drive sprocket. The illustrated embodiment of the present invention utilizes a coaxial front arm mount as discussed herein to facilitate weight transfer and pitch.

As for the frame assemblies, traditional snowmobiles utilize a long tunnel structure to which the driveshaft and rear suspension mounts beneath. Above the tunnel typically sits a fuel tank and seat. This type of structure is adequate because most spring/damper forces are reacted internal to the suspension and between the front and rear arm mounts. Additional structure to the base tunnel is only required between these mounts.

SUMMARY OF THE INVENTION

One of the embodiments herein disclosed is a snowmobile, comprising a tunnel; a chassis structurally mounted to the tunnel; slide rails for mounting endless track; at least one front linkage operatively connecting the slide rails to one of the chassis or the tunnel; and at least one rear linkage operatively connecting the slide rails to the chassis.

At least one linear force element (LFE) may be positioned between the chassis and the rear linkage. The at least one LFE may be positioned outside of the envelope defined by the endless track. The at least one LFE may be positioned above the tunnel. The chassis is comprised of framing attached to the exterior of the tunnel, and comprises a central bracket to which one end of the LFE is attached. The snowmobile may further comprise a drive shaft mounted transversely through the tunnel, where the front linkage is attached to the tunnel, at a position coaxial with the drive shaft. The chassis may further comprise load arms directing forces along a load path which are coincident with a rotational axis of the drive shaft.

The chassis may further comprise tubes, attached to and straddling the tunnel, where the tubes extend substantially vertically. The vertical tubes may define a steering hoop. The chassis may further comprise a seat mount frame. The snowmobile may further comprise at least one linear force element (LFE) positioned above the endless track, with a seat mounted above the LFE.

In another embodiment, a snowmobile comprises a tunnel; a chassis structurally mounted to the tunnel; slide rails for mounting endless track, and being operatively connected to the tunnel about a rotational axis; at least one linear force element (LFE) positioned intermediate the chassis and slide rails; whereby at least some of the force exerted on the chassis is directed along a load path coincident with the rotational axis.

The snowmobile may further comprise at least one front linkage operatively connecting the slide rails to one of the chassis or the tunnel; and at least one rear linkage operatively connecting the slide rails to the chassis. The at least one LFE is positioned between the chassis and the rear linkage. The at least one LFE is positioned outside of the envelope defined by the endless track. The at least one LFE is positioned above the tunnel. The chassis may be comprised of framing attached to the exterior of the tunnel, and may comprise a central bracket to which one end of the LFE is attached. The snowmobile may further comprise a drive shaft mounted transversely through the tunnel at a position coaxial with the rotational axis. The chassis may further comprise load arms directing forces along a load path which is coincident with the drive shaft rotational axis. The chassis may comprise tubes, attached to and straddling the tunnel, where the tubes extend substantially vertically. The tubes define a steering hoop.

In yet another embodiment, a snowmobile may comprise a tunnel; a chassis structurally mounted to the tunnel, comprising framing attached to the exterior of the tunnel, and further comprising a central bracket; slide rails for mounting endless track being operatively connected to the tunnel or chassis; and at least one linear force element (LFE) positioned intermediate the chassis central bracket and slide rails.

The chassis may comprise tubes, attached to and straddling the tunnel, the tubes extending substantially vertically. The tubes define a steering hoop. The snowmobile may further comprise at least one front linkage operatively connecting the slide rails to the tunnel; and at least one rear linkage operatively connecting the slide rails to the chassis. The snowmobile may further comprise a drive shaft mounted transversely through the tunnel, wherein the front linkage is attached to the tunnel, at a position coaxial with the drive shaft. The chassis may further comprise load arms directing forces along a load path which are coincident with the drive shaft rotational axis. The at least one LFE may be positioned outside of the envelope defined by the endless track. The at least one LFE may be positioned above the tunnel.

BRIEF DESCRIPTION OF THE DRAWINGS

Embodiments of the present snowmobile will now be discussed with reference to the drawings, where:

FIG. 1 shows a diagrammatical view of a conventional snowmobile suspension system in full rebound;

FIG. 2 shows a diagrammatical view of a conventional snowmobile suspension system in full jounce;

FIG. 30 shows the rear chassis of FIG. 29 attached to a tunnel;

FIG. 31 shows the rear chassis of FIG. 30 with a seat mounting frame;

DETAILED DESCRIPTION OF EMBODIMENTS OF THE INVENTION

Features and advantages of the present invention will become apparent to those skilled in the art upon consideration of the following detailed description of illustrative embodiments exemplifying the best mode of carrying out the invention as presently perceived.

The embodiments disclosed below are not intended to be exhaustive or to limit the invention to the precise forms disclosed in the following detailed description. Rather, the embodiments are chosen and described so that others skilled in the art may utilize their teachings.

A progressive rear suspension is disclosed for a rear suspension system of a snowmobile. A progressive suspension is one having a stiffness that increases throughout (or at least substantially throughout) the entire range of suspension travel.

A diagrammatical depiction of the progressive suspension is shown in FIGS. 8-14, and will be described representatively. This progressive suspension provides improved ride with less bottoming and better energy dissipation.

Figure 8:
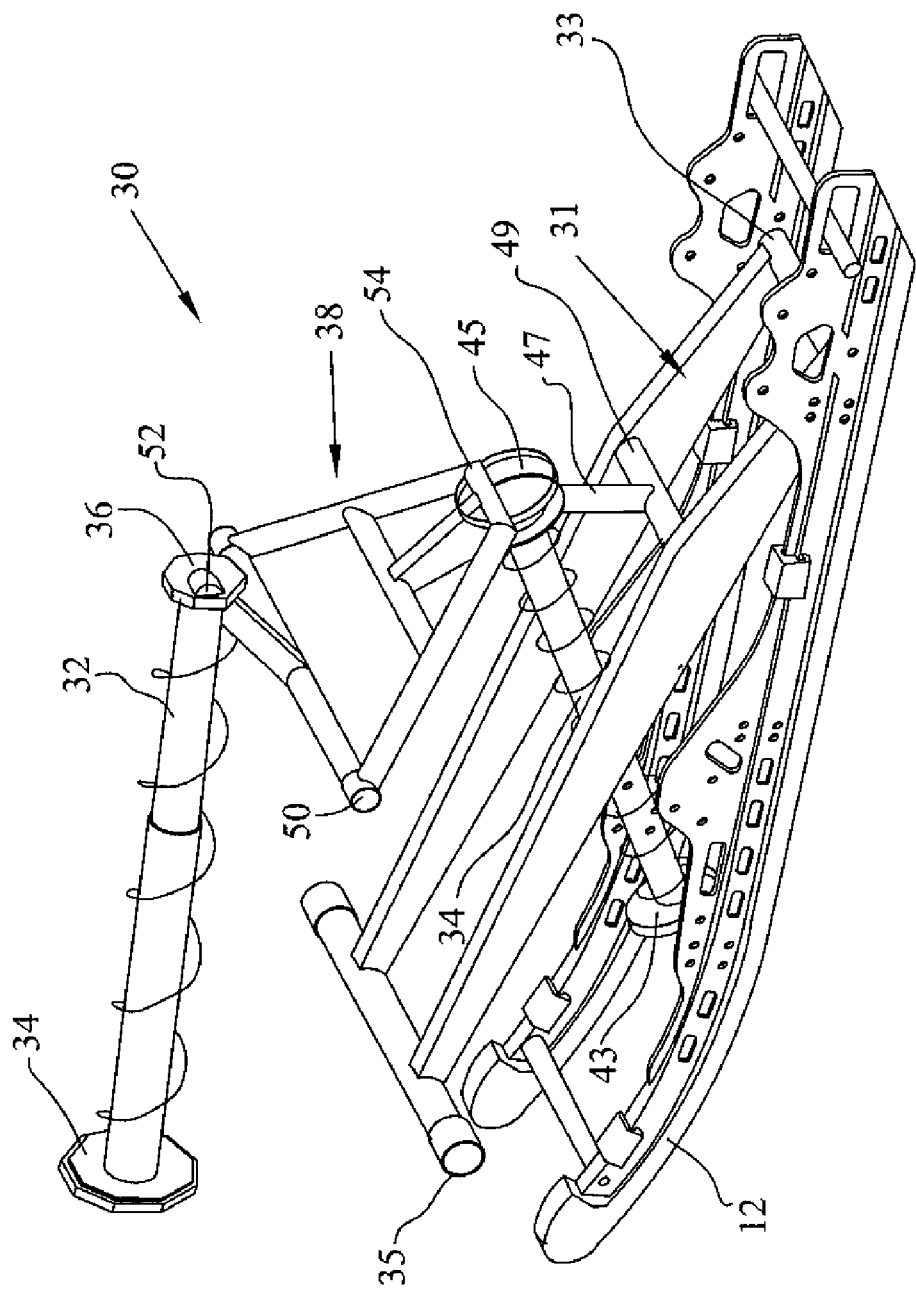
FIG. 8 shows a diagrammatical perspective view of the suspension of the present invention.
Figure 9:
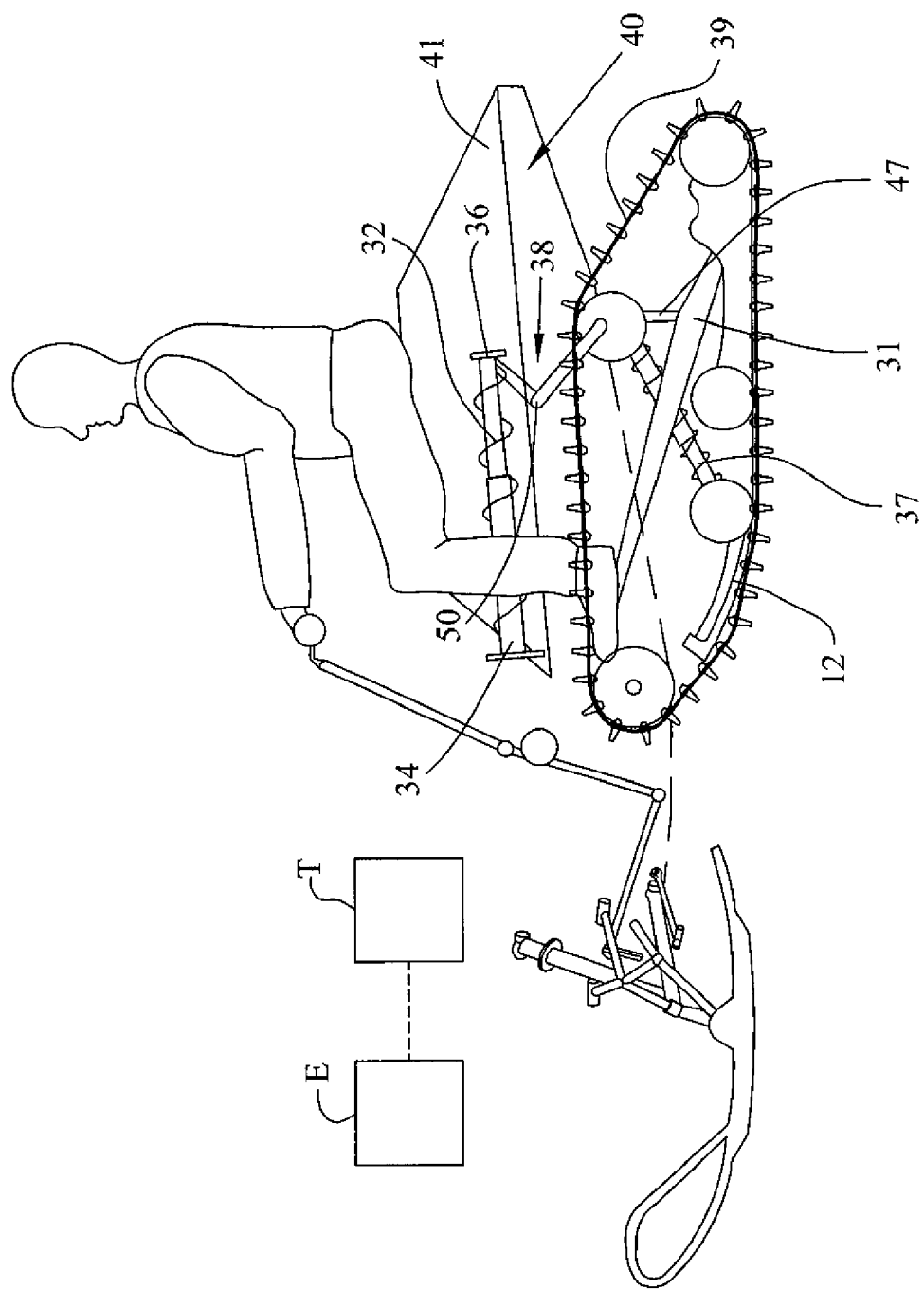
FIG. 9 shows a diagrammatical plan view of the suspension of FIG. 8.

With reference first to FIGS. 8 and 9, an illustrated embodiment of a suspension 30 of the present invention is shown. Suspension 30 includes a pair of slide rails 12, and a swing arm 31 having a first end coupled to slide rails 12 at location 33 and a second end 35 pivotably coupled to the chassis. A frame 41 (FIG. 9) is configured to define a tunnel 40 which receives the track 39 therein. In the illustrated embodiment, the main LFE 32 is located generally horizontally above the tunnel 40 with one end connected to the chassis at location 34 and the other end 36 connected to a bell crank 38 that redirects the load vertically. A second LFE 37 includes a first end 43 which is pivotably coupled to the slide rails 12. A second end 45 of LFE 37 is pivotably coupled to link 47. As shown in FIG. 8, an opposite end of link 47 is pivotably coupled to swing arm 31 by connector 49. As discussed below bell crank 38 generally forms a triangular shape with corner 50 coupled to the chassis, corner 52 coupled to end 36 of LFE 32, and corner 54 coupled to end 45 of LFE 37.

It is understood that the actual architecture of the rest of the suspension 30 may vary from what is shown in FIGS. 8 and 9. Many prior art suspensions may also benefit from this design by connecting the horizontal LFE 32 to any of the suspension arms through a bell crank 38. The bell crank 32 redirects the shock load vertically. By changing the length and angles between the input and output arms of the bell crank 38, a progressive rate can be achieved for virtually any suspension design.

As discussed above, the main LFE 32 is illustratively placed outside the envelope defined by track 39 and above the tunnel 40 as shown in FIG. 9. One end 34 of the LFE 32 is connected to the chassis and the other end 36 is connected to an end of a bell crank 38. The other end of the bell crank 38 is connected to the suspension components, either through a link, pivot, slider, or other suitable connection. The suspension components extend around the track 39 in order to connect components located within the envelope of the track 39 to the LFE 32. Details of an illustrated embodiment of this connection are described below.

As shown in FIG. 9, one such improved suspension places at least one LFE outside the envelope defined by the track and above the chassis tunnel. One end of the LFE is connected to the chassis and the other end is connected to an end of a bell crank. The other end of the bell crank is connected to the suspension components, either through a link, pivot, slider, or other suitable connection. As the suspension compresses into jounce, the suspension end of the bell crank moves vertically some amount which causes the crank to rotate. This, in turn, causes the LFE end of the bell crank to move horizontally and stroke the LFE. This is what provides the vertical suspension rate.

Comparing an example of the improved suspension at full rebound (FIG. 10) to full jounce (FIG. 11), it is shown that the horizontal distance from the crank pivot to the crank suspension end increases. This increase of the "output" bell crank moment arm by itself would make the vertical load decrease through travel. However, the vertical distance between the crank pivot and the crank LFE end increases. This increase in the "input" bell crank moment arm balances the increase in the "output" and maintains the vertical load. By changing the relative length of the arms and the angles between them, a progressive rate can be generated for most suspension load cases.

Figure 10:
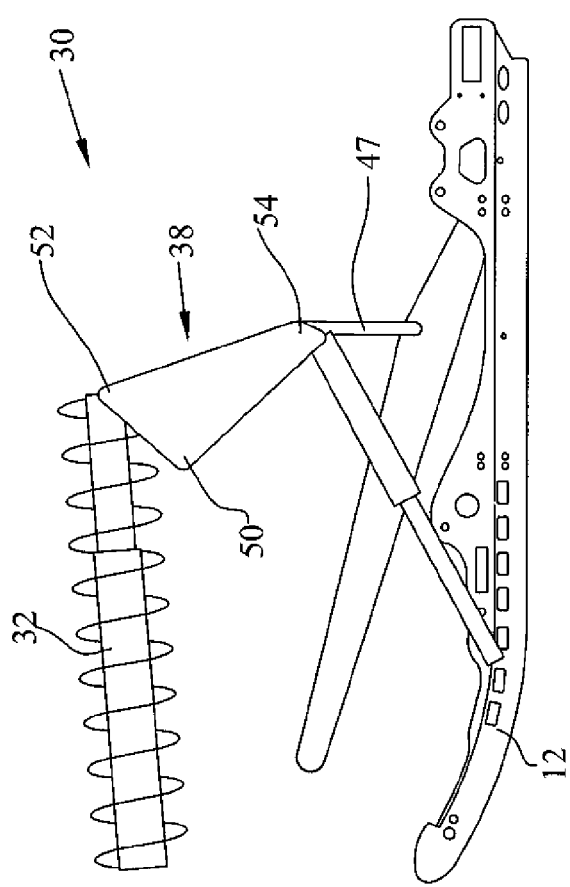
FIG. 10 shows a diagrammatical plan view of the suspension of the present invention at full rebound.
Figure 11:
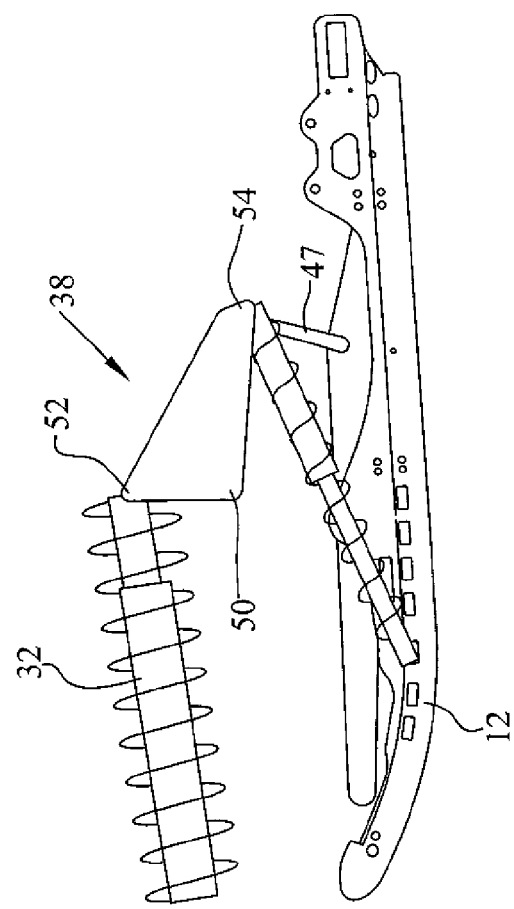
FIG. 11 shows a diagrammatical plan view of the suspension of the present invention at full jounce.

The arm lengths and angles of the bell crank 38 are important to the operation of the suspension 30. FIGS. 10 and 11 show the illustrated embodiment at full rebound and at full jounce, respectively. The large triangle represents the bell crank 38. The left corner of the triangle 50 below the LFE 32 is the pivot connector to the chassis. The top most corner 52 is connected to the LFE 32, and the bottom most corner 54 is connected to the suspension (in this case through the link 47). Comparing the suspension 30 at full rebound (FIG. 10) to full jounce (FIG. 11), it is shown that the horizontal distance from the crank pivot to the crank suspension end increases. This increase of the "output" bell crank moment arm by itself would make the vertical load decrease through travel. However, the vertical distance between the crank pivot and the crank LFE end increases. This increase in the "input" bell crank moment arm balances the increase in the "output" and maintains the vertical load. By changing the relative length of the arms and the angles between them, a progressive rate can be generated for most suspension load cases.

Figure 12:
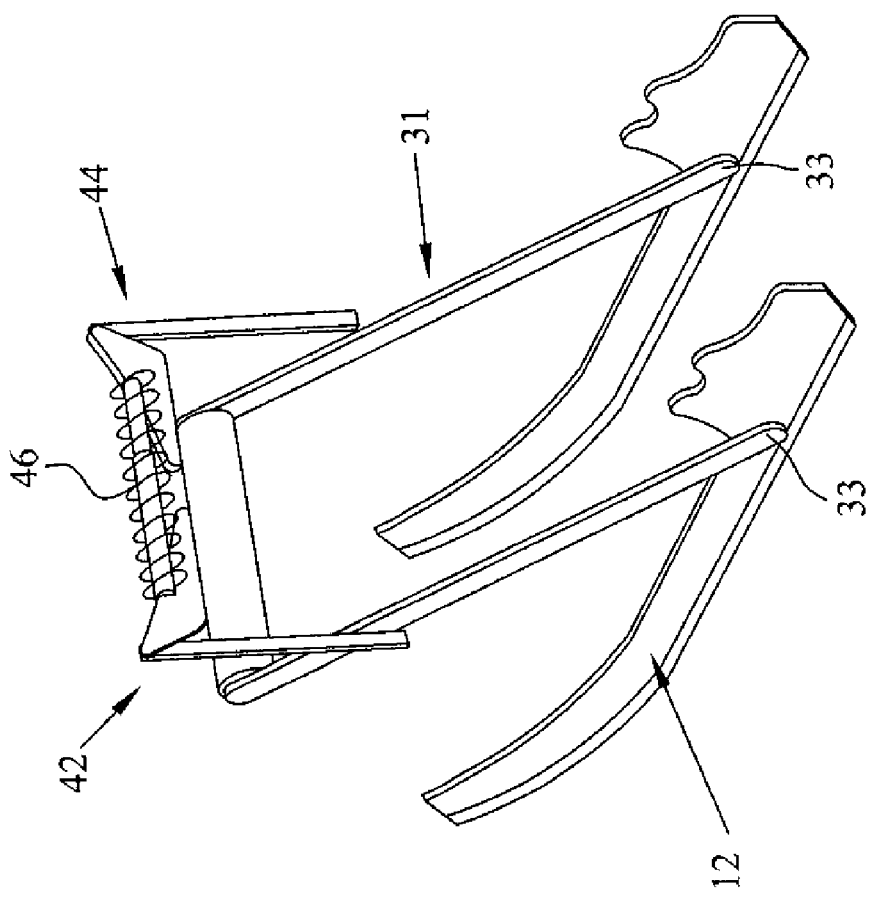
FIG. 12 shows a diagrammatical perspective view of an alternate suspension.

Another illustrated embodiment uses two bell cranks 42, 44 which connect to the suspension at two points so an LFE 46 is actuated from both ends as shown in FIG. 12. In this illustrated embodiment, the LFE 46 may be placed front-to-back or left-to-right above the tunnel 40. FIG. 12 shows a design with the LFE 46 placed left-to-right between bell cranks 42, 44.

Figure 3:
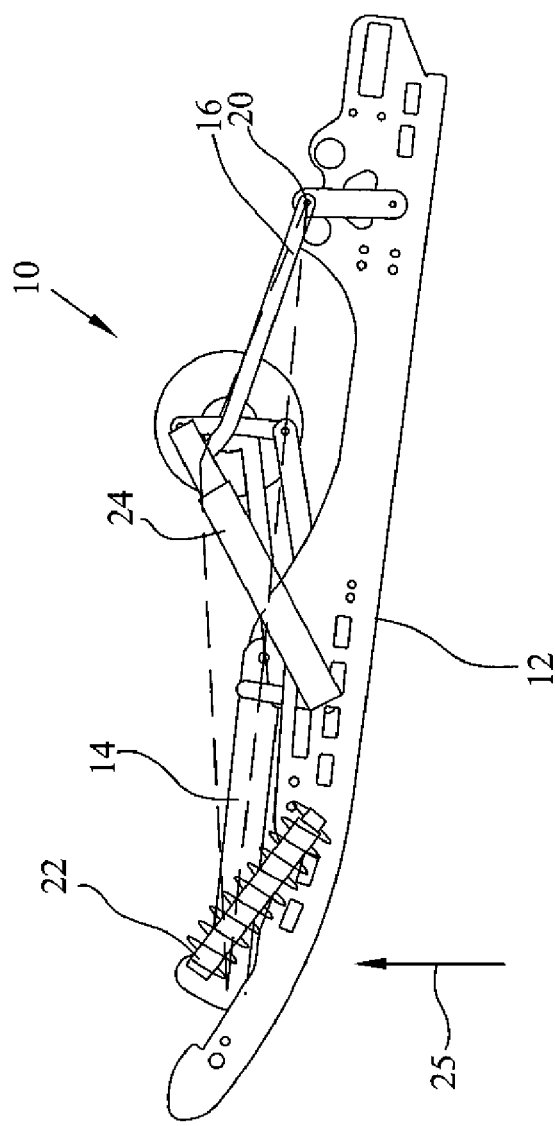
FIG. 3 shows the diagrammatical view of a conventional snowmobile suspension system according to FIGS. 1 and 2, with a front load applied.
Figure 4:
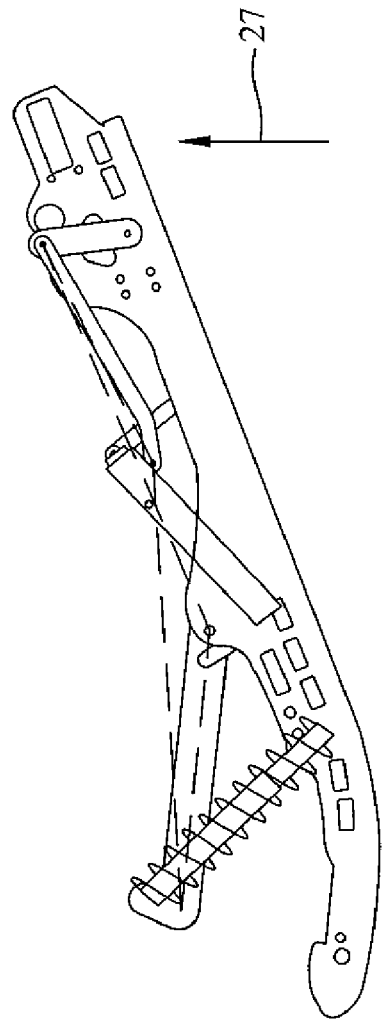
FIG. 4 shows the diagrammatical view of a conventional snowmobile suspension system according to FIGS. 1 and 2, with a rear load applied
Figure 5:
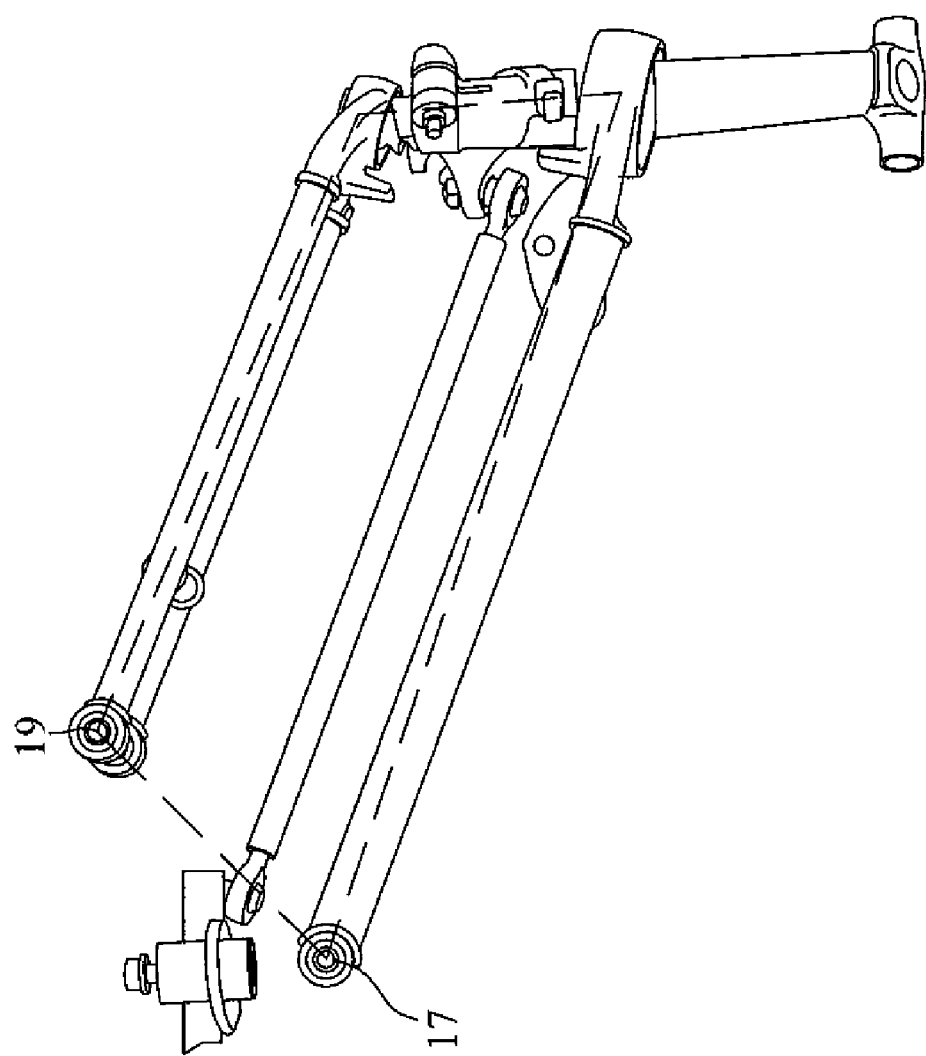
FIG. 5 shows a diagrammatical view of a conventional snowmobile front suspension system.
Figure 6:
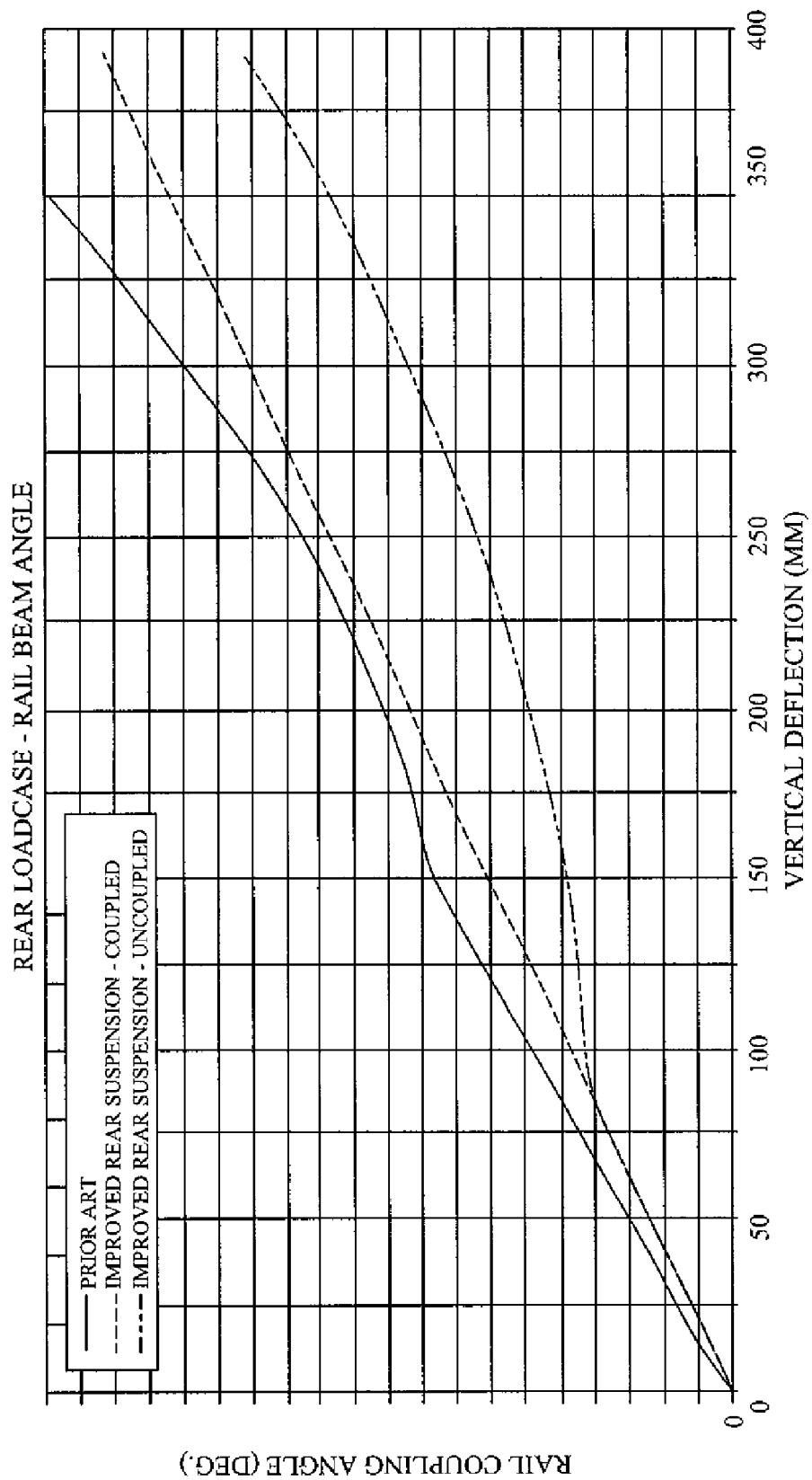
FIG. 6 shows a comparison curve of the prior art versus the improved suspend with a rear load.
Figure 7:
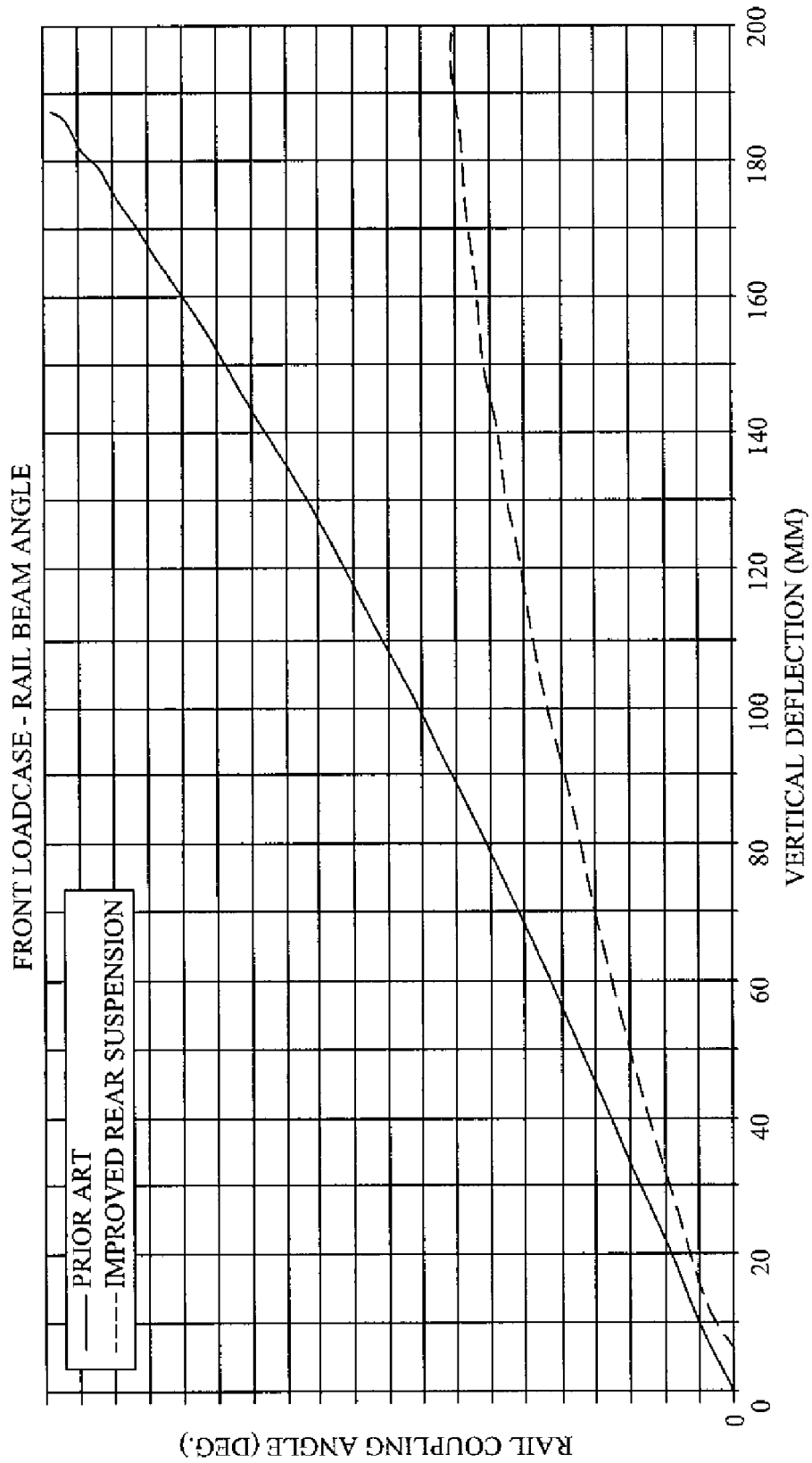
FIG. 7 shows a comparison curve of the prior art versus the improved suspend with a front load.
Figure 13:
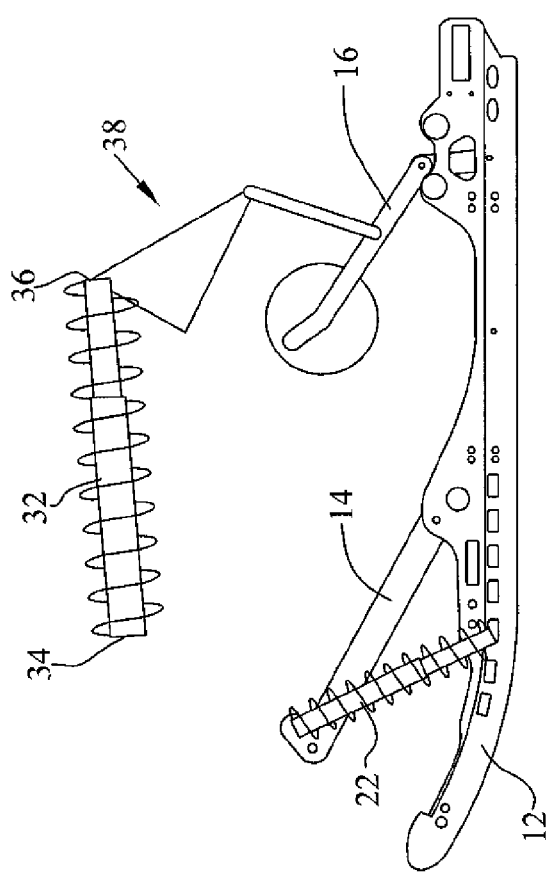
FIG. 13 shows a diagrammatical plan view of the suspension of the present invention retro-fit on an existing suspension.
Figure 14:
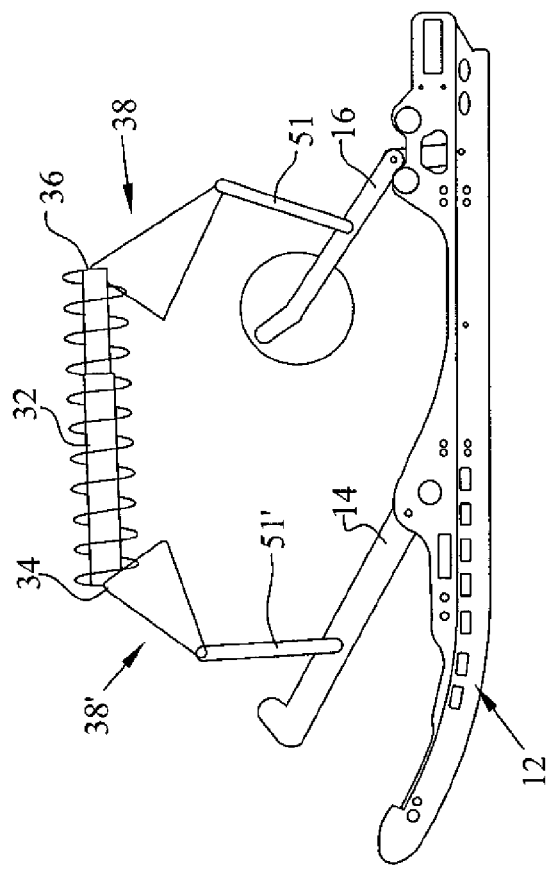
FIG. 14 shows a diagrammatical plan view of another suspension of the present invention retro-fit on an existing suspension.

As stated above, the present invention may also be applied to existing rear suspensions, and FIGS. 13 and 14 show a retro-fit to the Polaris Fusion® rear suspension shown in FIGS. 1-3. FIG. 13 discloses use of a single bell crank 38 coupled between rear suspension arm 16 and LFE 32. FIG. 14 discloses use of dual bell cranks 38 and 38'. In FIG. 14, a first end of bell crank 38 is coupled to end 36 of LFE 32 and a second end of bell crank 38 is coupled to rear suspension arm 16 by link 51. A second bell crank 38' has a first end coupled to end 34 of LFE 32 and a second end coupled to front suspension arm 14 by link 51'.

Operation of only one illustrated suspension architecture will be discussed since the general operation is the same regardless of where the suspension end of the bell crank 38 is connected. As the suspension compresses into jounce, the suspension end of the bell crank 38 moves vertically some amount which causes the crank 38 to rotate. This, in turn, causes the LFE end of the bell crank 38 to move horizontally and stroke the LFE. This is what provides the vertical suspension rate.

With reference now to FIGS. 15-32, a complete depiction of one embodiment of the rear suspension 60 of the present invention will be described. Those elements referenced by reference numbers identical to the numbers above perform the same or similar function.

Figure 15:
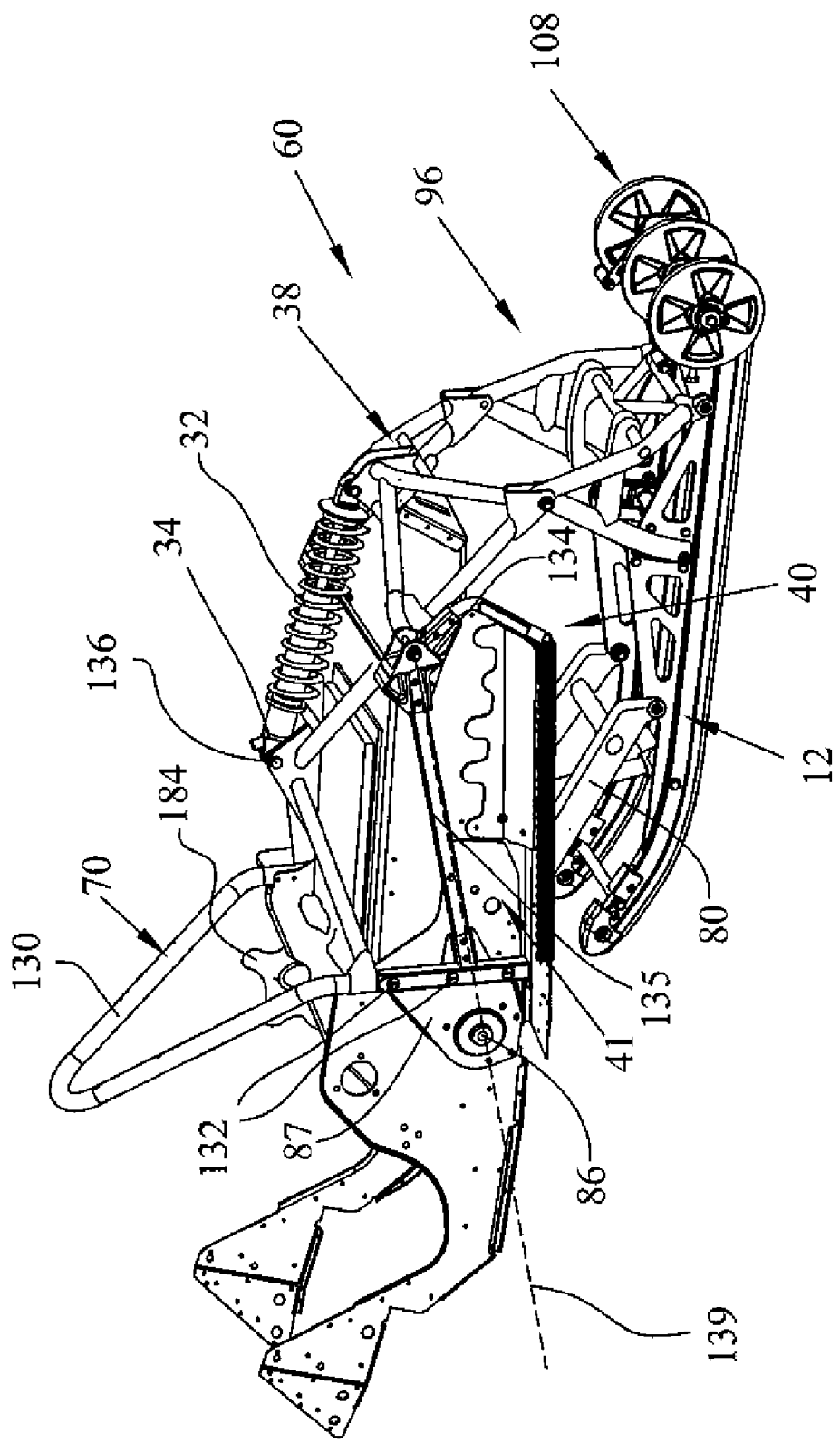
FIG. 15 shows a perspective view of the suspension of the present invention applied to a tunnel and to slide rails.
Figure 16:
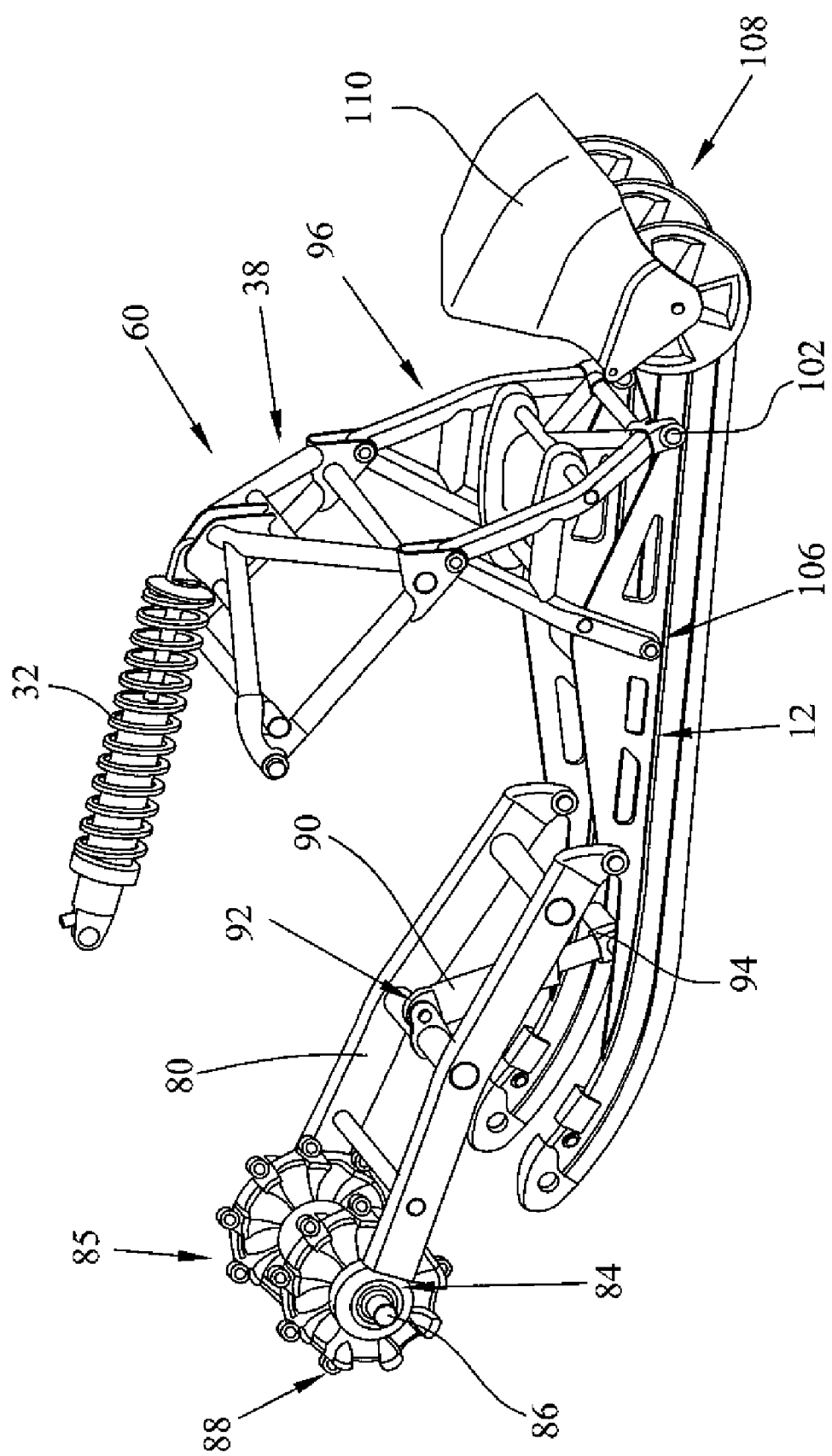
FIG. 16 shows a perspective view of the suspension of FIG. 16, with the chassis and tunnel removed.
Figure 17:
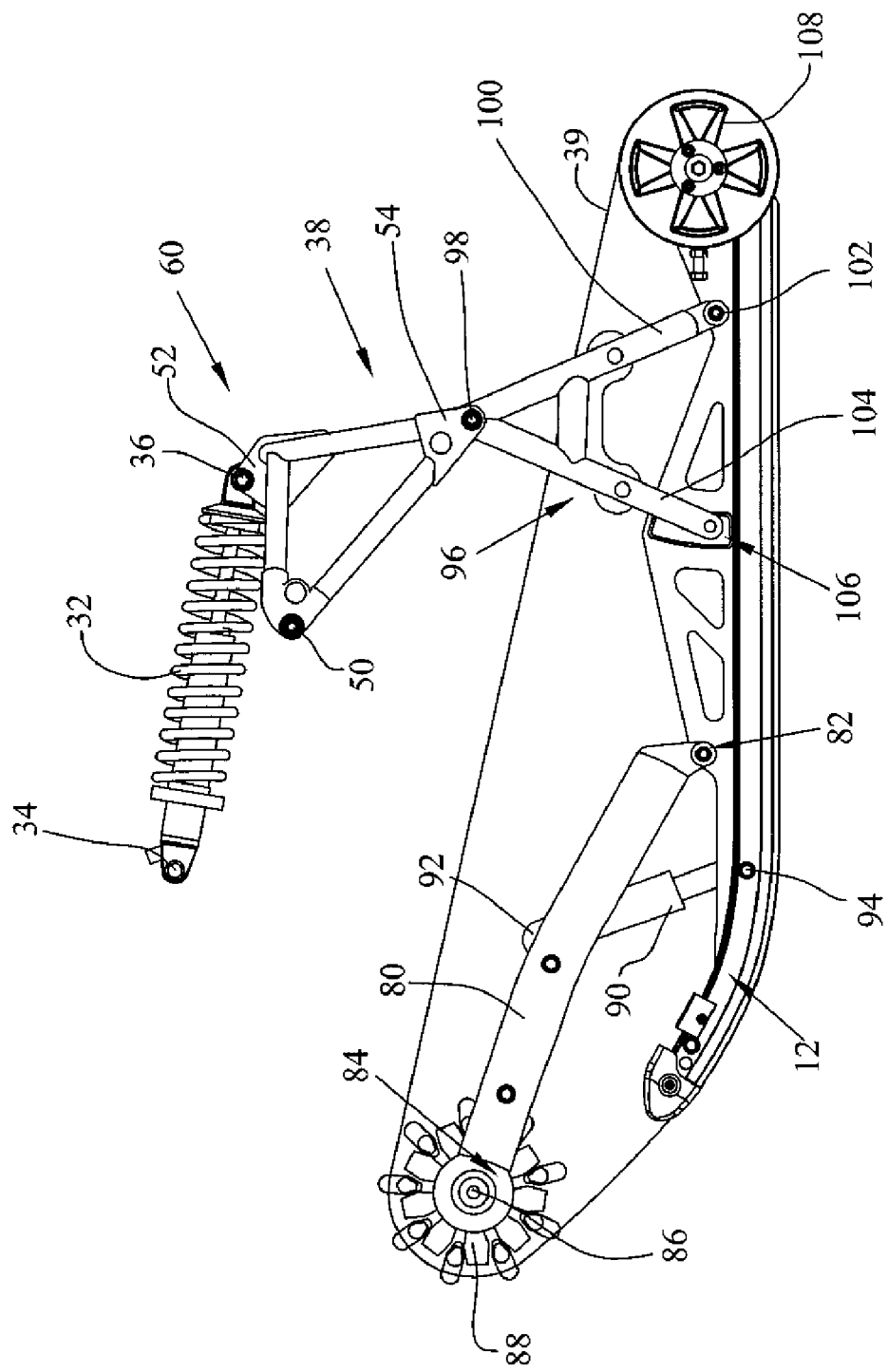
FIG. 17 shows a plan view of the FIG. 16 embodiment.

With reference first to FIGS. 15-17, rear suspension 60 is shown attached to tunnel 40, and illustrates the suspension 60 coupled to a frame 41 which defines the tunnel 40 for track 39 (FIGS. 16-17). This system is generally comprised of, slide rails 12, LFE 32, bell crank 38, tunnel 40, chassis 70, front swing arms 80 and an A-shaped pivot member 96. More particularly, LFE 32 is shown suspended between bell crank 38 and a chassis structure 70. Bell crank 38 is attached to A-shaped pivot member 96, which in turn is attached to slide rails 12. Bell crank 38 and A-shaped pivot member 96 define a rear linkage connecting the slide rails 12 to the chassis 70. FIG. 17 shows that the main LFE 32 is located horizontally above the frame 41 which defines the tunnel 40.

Figure 18:
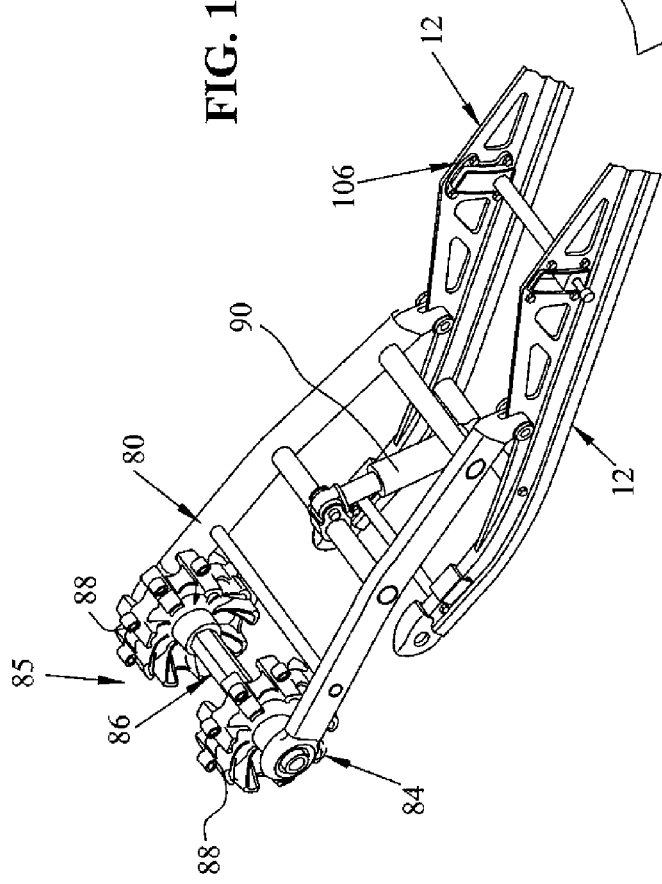
FIG. 18 shows an enlarged perspective view of FIG. 16, showing the front suspension mounts.
Figure 19:
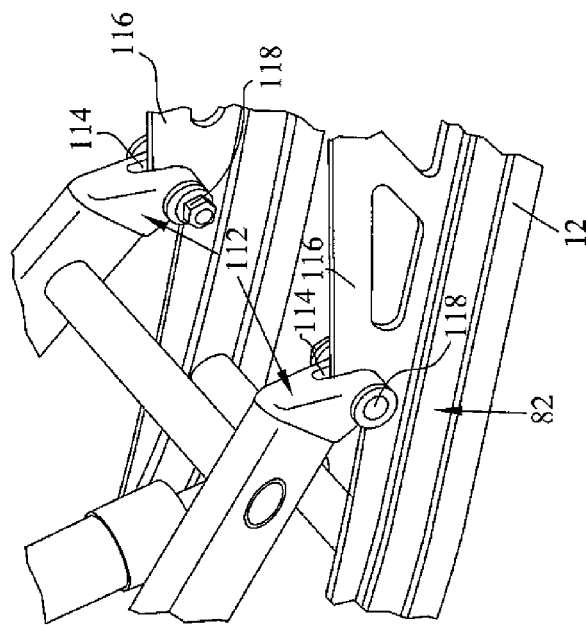
FIG. 19 shows an enlarged view of the connection of the front suspension mounts of FIG. 18 to the slide rails.

In the embodiment of FIGS. 15-17, and as best shown in FIGS. 16 and 17, a front swing arm 80 is pivotably coupled to the slide rails 12 by a pivot connection 82 as discussed in further detail below. Front swing arm 80 is defined by two front linkages. An opposite end 84 of swing arm 80 is pivotably coupled to the chassis about which a drive mechanism 85 is attached, having an axis which is coaxial with a drive shaft 86 as also discussed in detail below. With reference first to FIGS. 18 and 19, the connection of the front swing arm 80 to slide rail 12 will be described.

Traditional suspensions typically mount the front and rear control arms to the slide rails in one of two methods: 1) Pivot shaft extends between beams and passes through a pivot tube on the arm, or 2) A left and right pivot shaft is mounted to the beams and each pass through a small pivot tube on the arm. Although both designs are relatively simple and have worked well in current designs, there are several problems with both.

The long pivot shaft works well to distribute suspension loads across a large area on the pivot shaft. However, maintaining lubrication is difficult and high bending loads can be present thus requiring a large through fastener. The short left/right pivot design can be used with small self lubricated bushings, but the cantilevered load also requires a large fastener.

A clevis joint design as shown in FIG. 19 solves the deficiencies of each of the above designs. The size of the joint makes it possible to use small lubricated bushings and because the clevis "straddles" the rail beam, no bending load is present in the fastener so smaller fasteners may be used with equivalent durability. In this design, the clevis portion of the joint is part of the control arm.

Clevis connection 82 is provided between the swing arm 80 suspension components and slide rail 12 as shown in FIG. 19. Ends 112 of swing arm 80 each include a slot 114 which receives a portion 116 of slide rails 12 therein. Bolts 118 then secure the ends 112 to portions 116 of the slide rails 12.

With respect again to FIG. 18, the front drive mechanism 85 will be described in greater detail. Drive shaft 86 rotates a plurality of drive sprockets 88 which have a plurality of teeth to engage and move the track 39 in a conventional manner. A pre-load spring 90 has a first end 92 pivotably coupled to swing arm 80 and a second end 93 pivotably coupled to slide rails 12 at pivot connection 94.

As mentioned above, conventional suspension arrangements pose two problems. First, track tension through suspension travel relies on the relative placement of the suspension arms and wheels to the drive shaft. Suspension mount locations are often determined not only by specific, desired suspension characteristics, but on track tension packaging. Problems are encountered from both an over and under tensioning track standpoint. Second, the front arm placement is limited to remain outside the drive sprocket diameter due to interference with drive train components. This creates problems when attempting to change the weight transfer behavior of the rear suspension, which is dominated by front arm mount location.

Both of these problems are solved by mounting the front swing arm 80 coaxial with the drive shaft 86 as discussed above and shown in detail in FIG. 18. Because the front swing arm 80 rotates around the same axis as the track drive sprocket 88, track tension is only influenced by the slide rail 12 approach bend profile and the rear suspension idler pulley 108. Also, the coaxial placement of the arm 80 creates improved weight transfer behavior of the rear suspension 60.

There are two illustrated arrangements in which the arm 80 is mounted coaxial to the drive shaft 86 either on the drive shaft 86 or the chassis. FIG. 18 shows the first arrangement where the arm 80 is mounted directly to the drive shaft 86. In this arrangement, bearings are used in the connection to allow the drive shaft 86 to rotate within the ends 84 of the suspension arm 80. The advantages of this connection are twofold, lateral packaging of the arm 80 in the chassis tunnel is easier, and the arm strengthens the drive shaft 86. In this embodiment, however, high speed bearings are required at this connection, and the drive shaft 86 must now react to suspension loads.

The second arrangement for mounting the swing arm 80 is to use larger hollow connections between the suspension arm and the chassis. The drive shaft 86 then passes through this connection. In the illustrated embodiment, a quick change drive shaft assembly is designed to be easily removed from a chassis. This provides improved serviceability and maintenance, and improved assembly procedure.

Traditional snowmobiles have typically used drive shafts that are wider than the tunnel. This is to simplify the number of parts in the assembly and still allow mounting to each edge of the tunnel with a single shaft. However, this makes assembly and service difficult. In order to remove the drive shaft you need to open the chain case, loosen the drive shaft bolt, slide the drive shaft out of the chain case, twist the drive shaft and remove it from the tunnel. Sliding the drive shaft and twisting to the side can be very difficult due to the tunnel/track clearance.

The illustrated embodiment provides two designs that make this process easier. The first design consists of a two part drive shaft assembly: an inner shaft and outer sleeve. The second consists of a removable spline stub that couples the shaft to the chain case.

Figure 20:
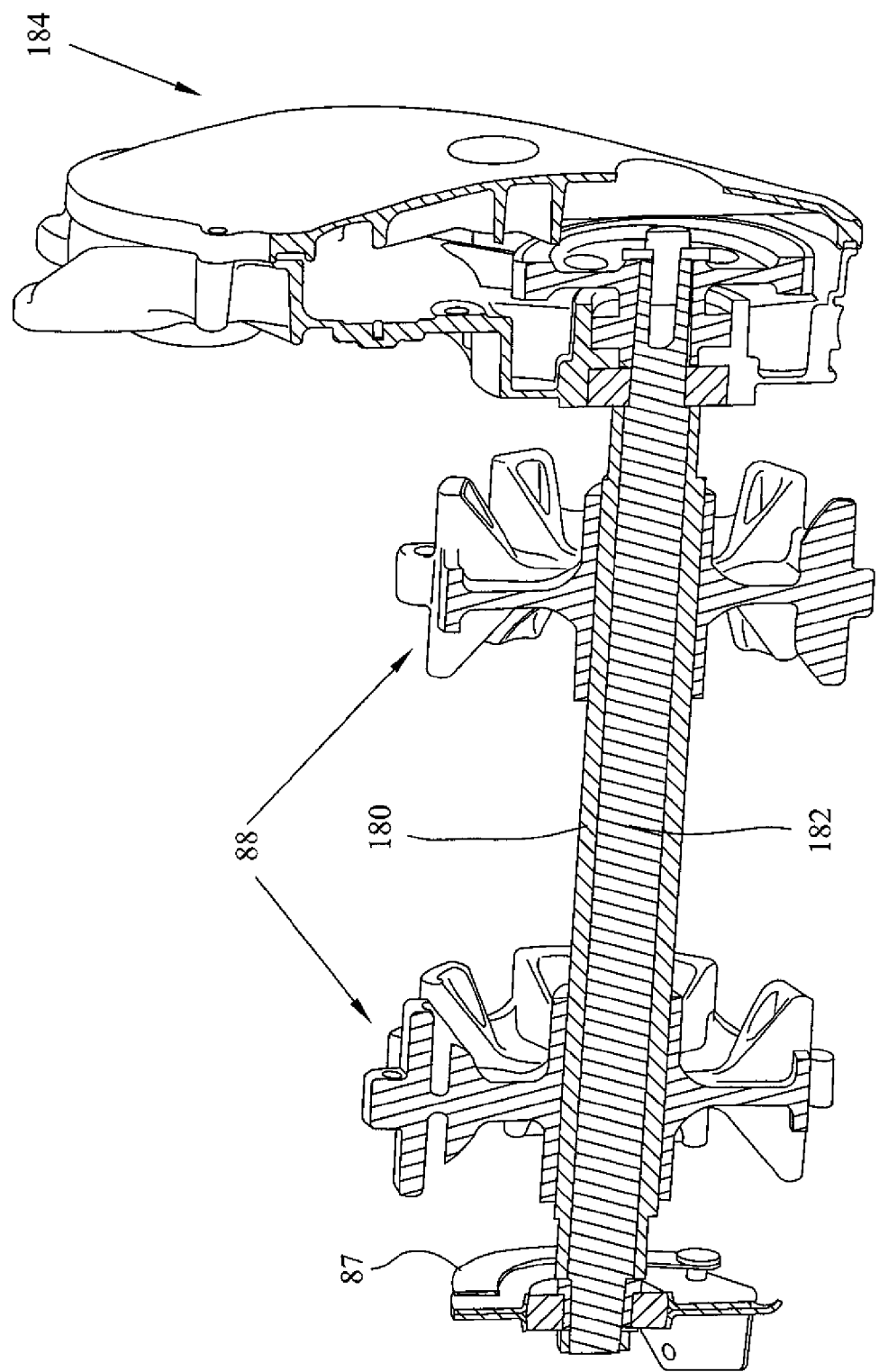
FIG. 20 shows a partial sectional view of one driveshaft assembly.
Figure 21:
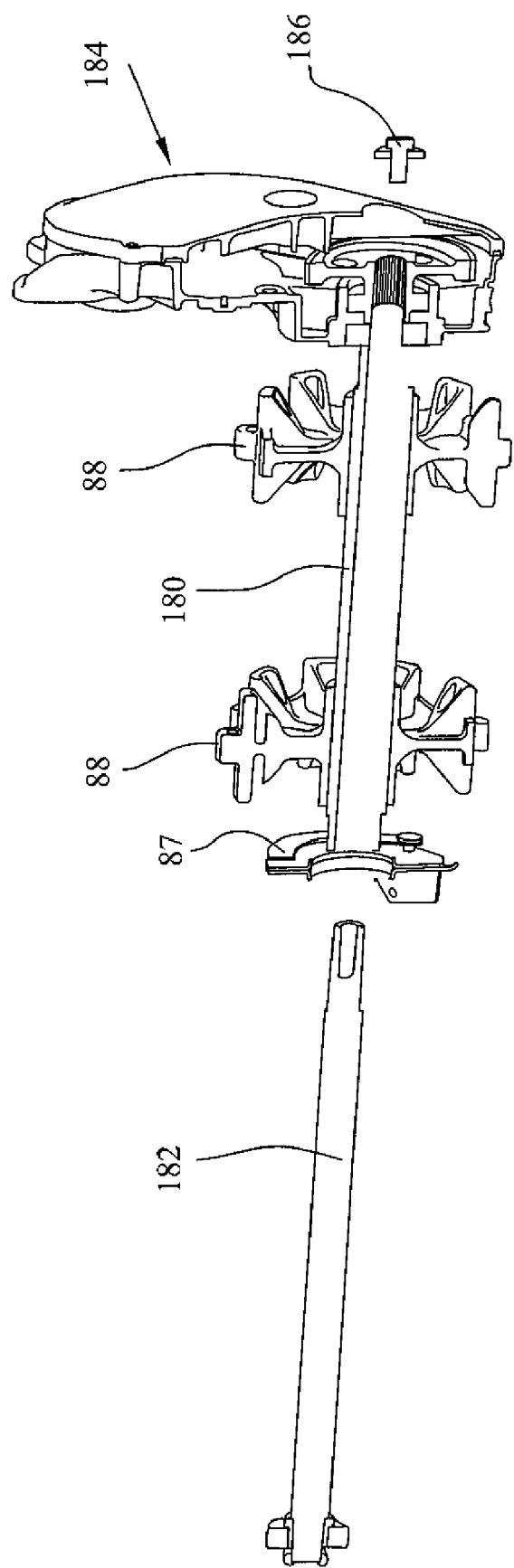
FIG. 21 shows the driveshaft assembly of FIG. 20, partially disassembled.

This first sleeve embodiment is depicted in FIGS. 20 and 21, and includes a drive shaft similar to current designs, but the drive sprockets 88 are mounted to an outer sleeve 180 (instead of the shaft directly) that is slightly narrower than the tunnel 40. The two parts are then torsionally coupled through either sliding splines, hexes, or other similar fit. The inner shaft 182 is tightly mounted to the chain case 184 by means of a fastener and the outer sleeve 180 is compressed when the inner shaft 182 is tightened from the end opposite the chain case 184.

To assemble this design, and as best shown in FIG. 21, the sleeve 180 is placed in the tunnel and the shaft 182 slides completely through the sleeve 180, from the outside of the tunnel, into the chain case 184. The shaft 182 is torsionally coupled to the drive mechanism inside the chain case and fastened solidly with a screw 186. The chain case 184 has an access opening 187 to install the screw 186 so the case 184 does not need to be opened to access the drive shaft 182. The entire assembly is clamped tight from the side opposite the chain case 184. As this is tightened, the outer sleeve 180 is compressed from each end by the main drive shaft bearings.

Figure 22:
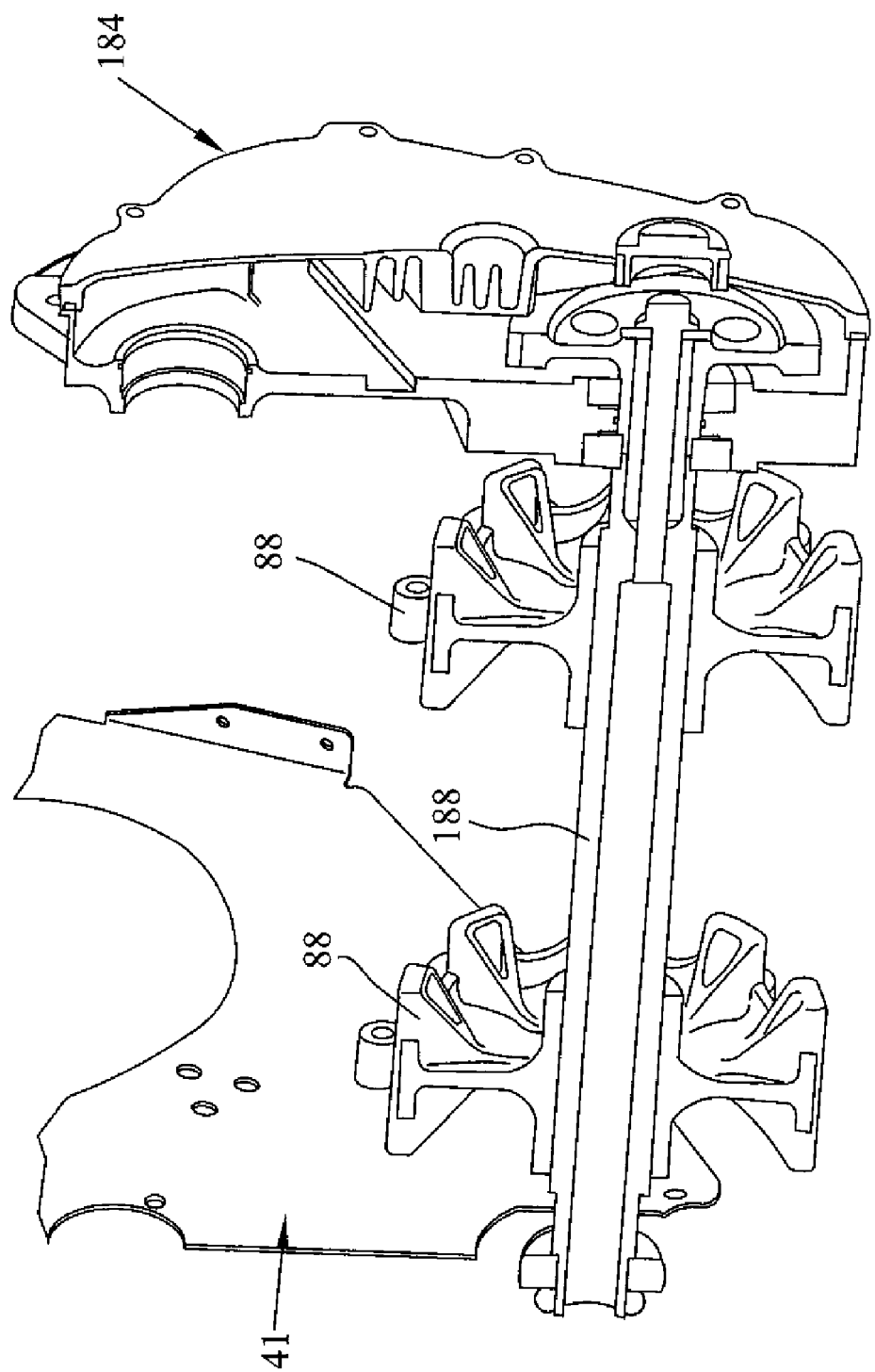
FIG. 22 shows a partial sectional view of another possible driveshaft assembly.
Figure 23:
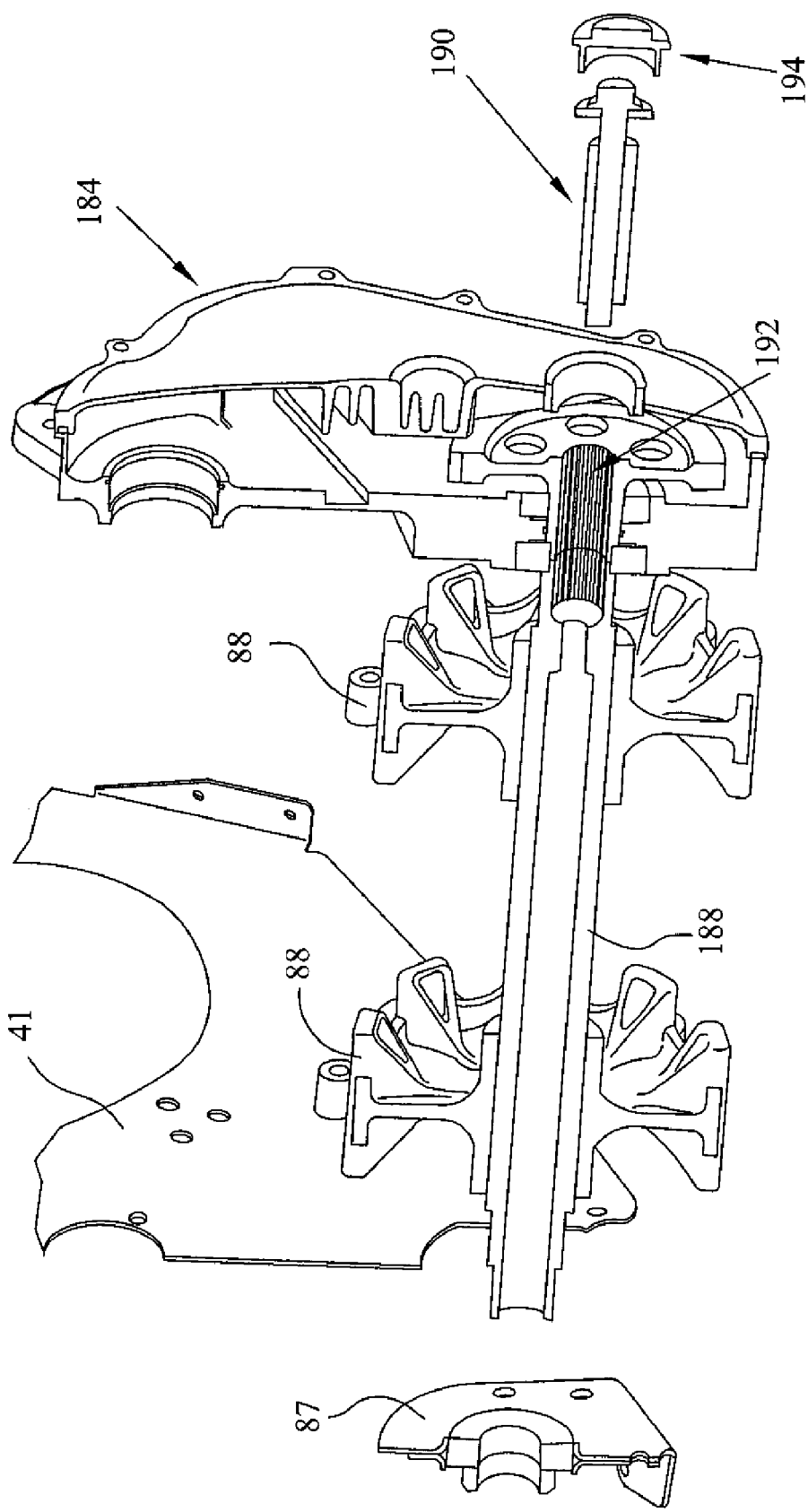
FIG. 23 shows the driveshaft assembly of FIG. 22, partially disassembled.

Alternatively, a drive shaft according to FIGS. 22 and 23 could be used, where a spline stub for coupling to the chain case 184 is female instead of male. This allows the overall length of the shaft 188 and the amount of shaft protruding inside the chain case 184 to be small. A spline stub 190 then torsionally couples the shaft 188 to the chain case drive mechanism 192.

To assemble this design, and with reference to FIG. 23, the drive shaft 188 is positioned slightly off center from the tunnel, enough for the chain case end of the shaft to clear the tunnel wall. A notch is present in the tunnel wall for the free end (non-chain case end) of the shaft to pass through into the correct position. The drive shaft 188 is then moved toward the chain case 184 and pilots on the case bearing. The spline stub 190 is then inserted from the outside of the chain case 184 and torsionally couples the drive shaft 188 to the chain case drive mechanism 192. An access hole 187 is present in the case cover so the case does not need to be opened to install or remove the stub 190. A fastener 191 is then threadably received in the end of the shaft 188, closest to the case 184, clamping the drive shaft 188 to the chain case. This fastener 191 is then enclosed by a cover 194 for the access hole 187. Lastly, the free end of the shaft 188 is tightened against the main drive shaft bearing.

Both methods are very beneficial with the coaxial mount suspension arm (discussed above). This allows the track and drive shaft to be assembled to the suspension and the entire suspension/track assembly placed into the chassis all at once.

An important consideration in rear suspension design is maintaining track tension through suspension travel. If the track becomes loose, it will skip drive sprocket teeth and damage the track. Extremely loose tracks can derail. Excessively tight tracks will yield high stresses on components and cause track vibration, stretch, and damage.

Achieving the mount points for desirable rate and kinematics is only half the challenge of snowmobile suspension design. Packaging a track around the suspension is the other. Traditional suspensions sacrifice more optimum suspension geometry to provide track tensioning and packaging which can be extremely difficult to manage.

The suspension of the present invention packages the suspension around the track. That is, the track actually passes through one or more suspension components. This design yields superb track tension values throughout travel. Due to a lack of a carrier (upper) track wheel, and coaxial mounting of the swing arm and drive sprocket, the tension in the illustrated embodiments only relies on the drive sprocket wheel 88 and idler wheels 108 to keep the track tight to prevent "unwrapping" around the rail bend profile as shown in FIGS. 15-17. Track tension is easily tuned by sizing the idler wheel 108 with the drive wheel 88. Therefore, elimination of carrier wheel in conjunction with coaxial swing arm mounting greatly simplifies track tensioning in the illustrated embodiments.

Figure 24:
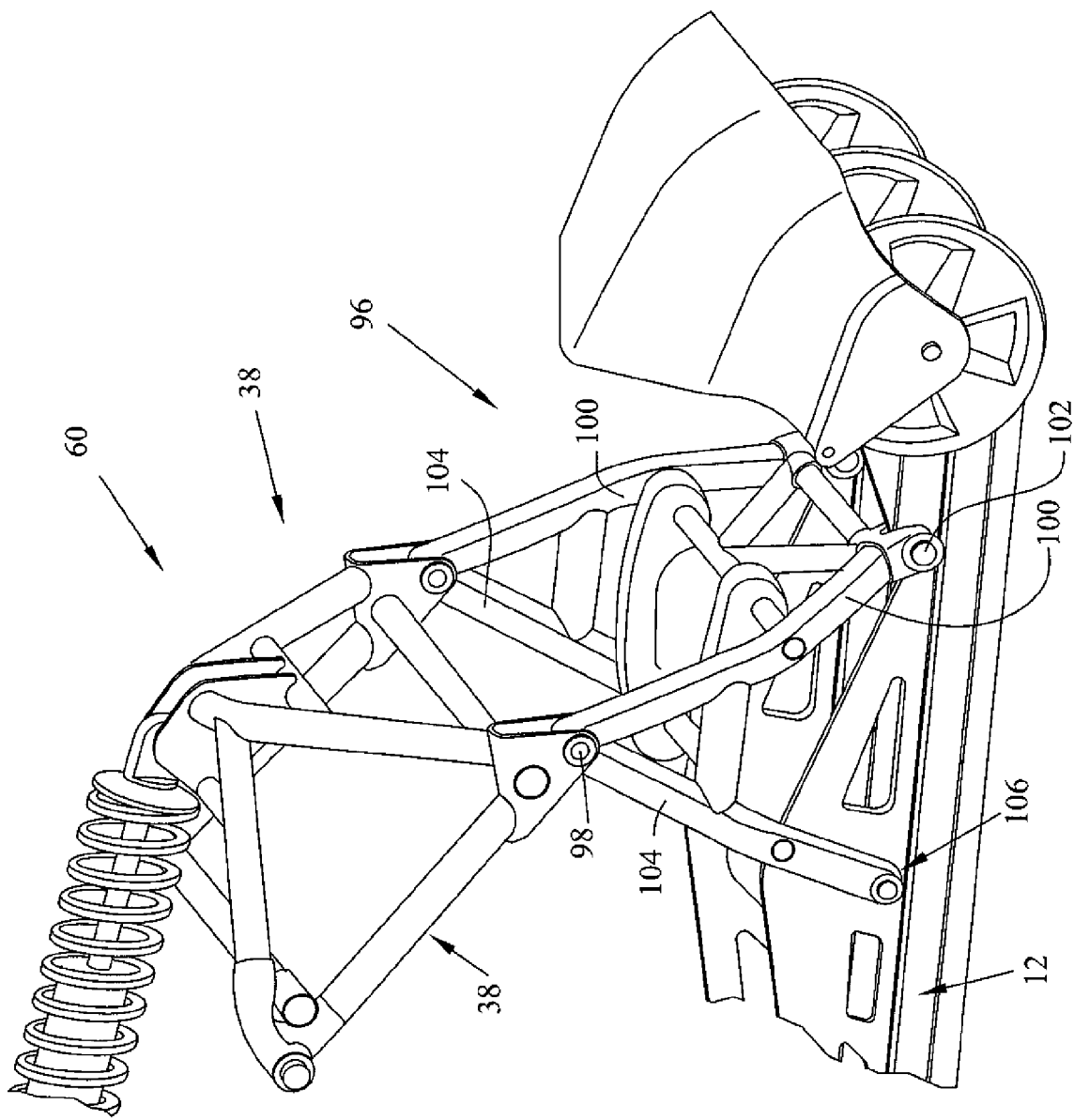
FIG. 24 shows an enlarged perspective view of FIG. 16, showing the rear suspension mounts to the slide rails.

With respect now to FIG. 24, A-shaped rear pivot 96 will be described in greater detail. As mentioned above, A-shaped rear pivot 96 connects bell crank 38 to LFE 32. A-shaped rear pivot 96 is shown pivotably coupled to bell crank 38 by connection 98. A first arm 100 of pivot 96 is pivotably coupled to slide rails 12 at location 102. As shown best in FIG. 25, second arm 104 of pivot 96 is coupled to slide rails 12 by a coupling slider 106, having an arced slot 107 that facilitates coupling between the front and rear. A block 105 coupled to arm 104 moves back and forth in slot 107.

This improved suspension also uses a changing "rail link" length to facilitate coupling. However, the pivot is considerably longer than traditional due to packaging around and outside the track envelope so that simple bumpers on the slide rail would not work effectively. Instead, the pivot is shaped as a triangle and the relative angle between the pivot and slide rails is limited by a curved slider mechanism, as described with reference to FIG. 25.

The advantages of this system are threefold. First, the horizontal length between the pivot-to-rail mount and the slider can be adjusted to reduce or increase the load within the slider system. Second, the load between these two points is shared by the slide rail itself so no additional structure is required on the pivot. Third, slots in the slider system provide lateral stiffness to the slide rails so additional components are not required to increase lateral strength or stiffness.

Figure 26:
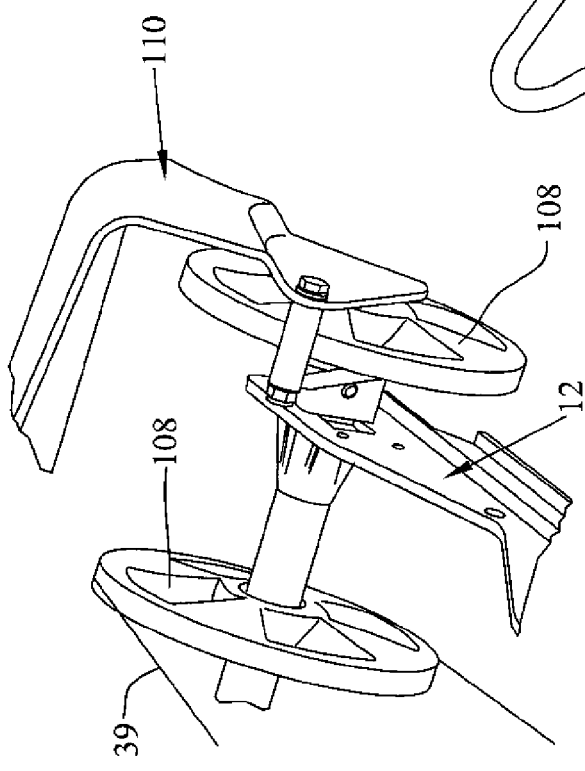
FIG. 26 shows an enlarged perspective view of the rear deflector shield.

FIG. 26 shows the attachment of both the rear idlers 108, and a rear deflector 110. Rear idler wheels 108 are coupled to the rear end of slide rails 12, as best shown in FIG. 26.

All snowmobiles utilize a snow flap to protect the rider and others from ice and snow being thrown from the track. This snow flap is typically attached to the chassis behind the rear most wheel of the suspension and is allowed to drag along the ground as the suspension is collapsed.

An alternative design is to use a suspension mounted deflector 110 similar to a motorcycle fender. By mounting directly to the idler wheel assembly only, the shield moves with the idler wheel when setting track tension and provides support through the use of an extended arm that is integral to the wheel assembly.

The following outlines the function of each component in the embodiment shown in FIGS. 15-17. The swing arm 80 is pivotally connected to the chassis coaxial with the drive shaft 86, low and forward on the slide rail 12 to facilitate weight transfer. The pivot 96 is pivotally connected to the slide rail 12 near the rear, and to an arced slot 107 that facilitates coupling. The pivot 96 is "locked" to the slide rail 12 at the extents of the slot 107. The geometry is coupled to the front when the pivot is at the bottom, to the rear when the pivot is at the top. The crank 38 is pivotally connected to the pivot 96 at one end 54 and the chassis at the other end 50. The crank 38 acts as the rear arm of the four-link. The preload spring 90 is connected between the swing arm 80 and the slide rail 12. This spring 90 is used for preload bias and does not appreciably affect rate. The main spring/damper 32 is connected between the crank 38 and the chassis. The location on both determines how progressive the suspension is.

As snowmobiles develop, accommodations in the chassis must be made for faster, more powerful engines, longer travel suspension, more precision handling, and improved durability. This means the chassis must be stronger and stiffer. The most intuitive method to increase strength and stiffness is to directly connect the suspension hard points with more significant structure than a thin walled tunnel can provide. The result is a direct load path between the front suspension mounts, the rider input points, and the rear suspension mount points, such that the load path can only terminate in a structurally durable member of the chassis.

Figure 27:
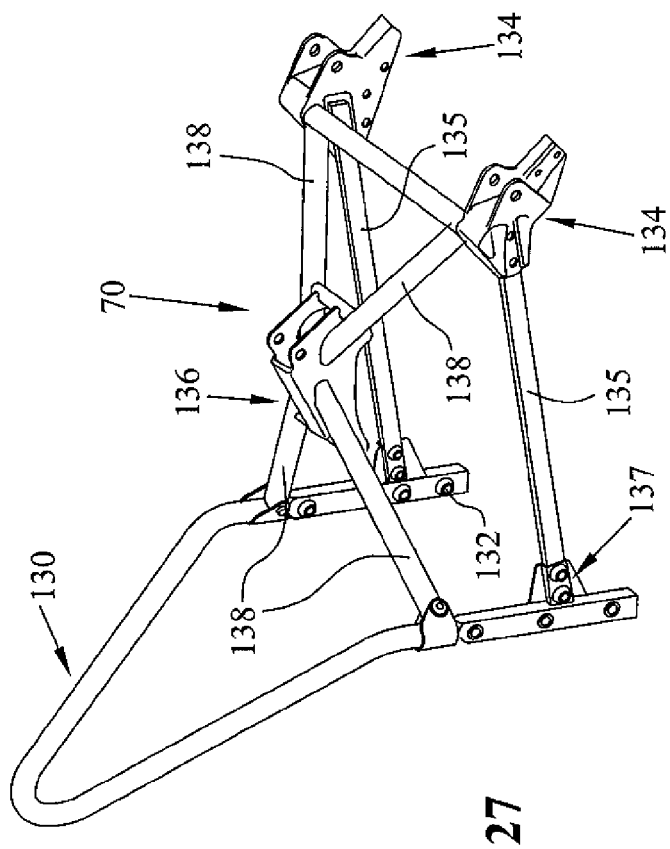
FIG. 27 shows an enlarged perspective view of the rear chassis of FIG. 15 removed.

The chassis structure, especially in the rear section of the snowmobile, becomes considerably more important when the LFE reacts outside the suspension, as described in the above discussion. In this case, rear suspension loads are not only internal to the suspension, but are directed into the chassis such that the chassis structure is an integral part of the suspension. As discussed above, a suspension system is described for support for the LFE 32 above the tunnel 40. The sub frame 70 was shown in FIG. 15 for mounting LFE 32 above tunnel 40. With reference now to FIG. 27, the snowmobile sub frame 70 will be described for mounting and supporting the LFE 32 above the tunnel 40.

Figure 28:
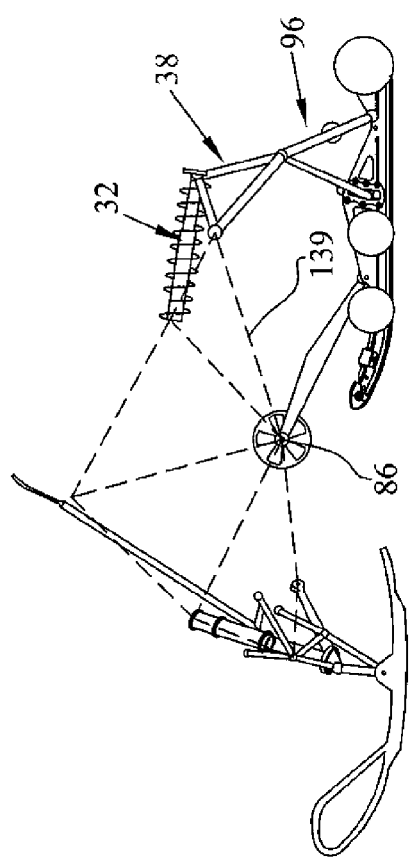
FIG. 28 is a diagrammatical view shows the force vectors applied to the suspension system.

In the embodiment of FIG. 27, a steering hoop 130 is mounted to opposite sides of the frame 41 (see FIGS. 9 and 15, where steering hoop 130 has two tubes which straddle the tunnel and are held by fasteners 132. Clevis brackets 134 are provided for coupling to opposite sides of the bell crank 38 (FIG. 15). A central bracket 136 is provided for coupling to end 34 of LFE 32 (FIG. 15). Four support arms 138 hold the bracket 136 in place as best shown in FIG. 27. Support arms or load arms 135 extend from brackets 134 to brackets 137 on opposite sides of the tunnel frame 41 as shown in FIG. 27. Each arm 135 directs forces along a load path from the bell crank 38 along a line 139 (shown in FIGS. 15 and 28) which passes through the axis or rotation of the drive shaft 86. FIG. 28 illustrates that a plurality of load paths are directed through the axis of rotation of drive shaft 86.

Figure 29:
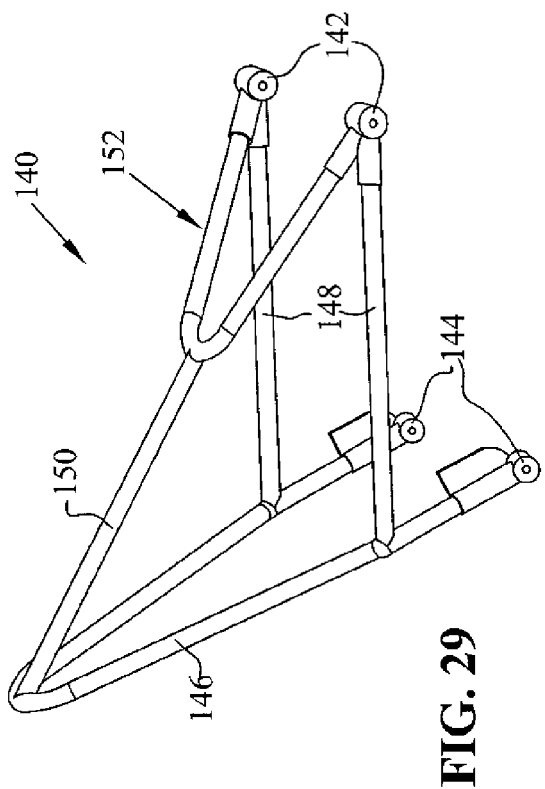
FIG. 29 is a perspective view of an alternate rear chassis removed.

In another illustrated embodiment shown in FIGS. 29 and 30, a sub frame assembly 140 connects the two rear suspension pivots 142, 144 and the top of the steering hoop 146. The sub frame 140 provides much more torsional stiffness than traditional stressed tunnel systems.

A traditional snowmobile chassis relies solely on the tunnel frame assembly 41 to provide support for the rear suspension. Modern performance snowmobiles are reaching levels of performance at which a stiffer chassis would be ideal. By using a frame to attach directly to the pivot points of the suspension, and tie into existing structure found at the steering hoop 146, the support structure of the rear suspension is made much stiffer. The tunnel frame 41, while still partly supporting the rear suspension, is primarily acting as a track shield and foot support.

The sub frame 140 includes 5 major points of connection to the snowmobile: The front and rear axis created by the rear suspension (on both sides of the snowmobile), and the top of the steering hoop, which will attach to existing structure in the front of the snowmobile. Connections at the suspension axes allow actual suspension pivots (shafts, bolts, etc.) to pass through the sub frame 140. The frame also has means (such as flanges) to attach to the tunnel frame 41.

The sub frame 140 sits atop the tunnel frame 41 as shown in FIG. 30 and is fastened to the tunnel frame 41, suspension pivots 142, 144 and steering hoop 146. As rear suspension pivots are attached directly to the frame, no load is transferred between the suspension and sub frame through the tunnel frame 41.

Steering hoop 146 is coupled to rear suspension pivots connectors 142 by arms 148. The top of steering hoop 146 is also coupled to the rear suspension pivot connectors 142 by an arm 150 connected to U-shaped member 152.

An advantage of this structure is the direct load paths between the LFE mount, the rear arm mount, and the front arm mount. Because the front arm is mounted coaxial with the driveshaft, the drivetrain (such as gearcase or transmission) also needs to be structural and becomes an integral part of the chassis structure. With this system, the tunnel itself may or may not be important to the overall chassis strength. If the tunnel was not structural, it would only acts as a snow shield and foot support.

This rear chassis structure, in particular, may be removable and form a type of chassis substructure or subframe, as shown in FIGS. 15 and 30. The sub frame includes four major points of connection to the snowmobile: the front and rear arm mounts of the rear suspension, the LFE mount, and the steering hoop, which is attached to structure in the front of the snowmobile.

Figure 32:
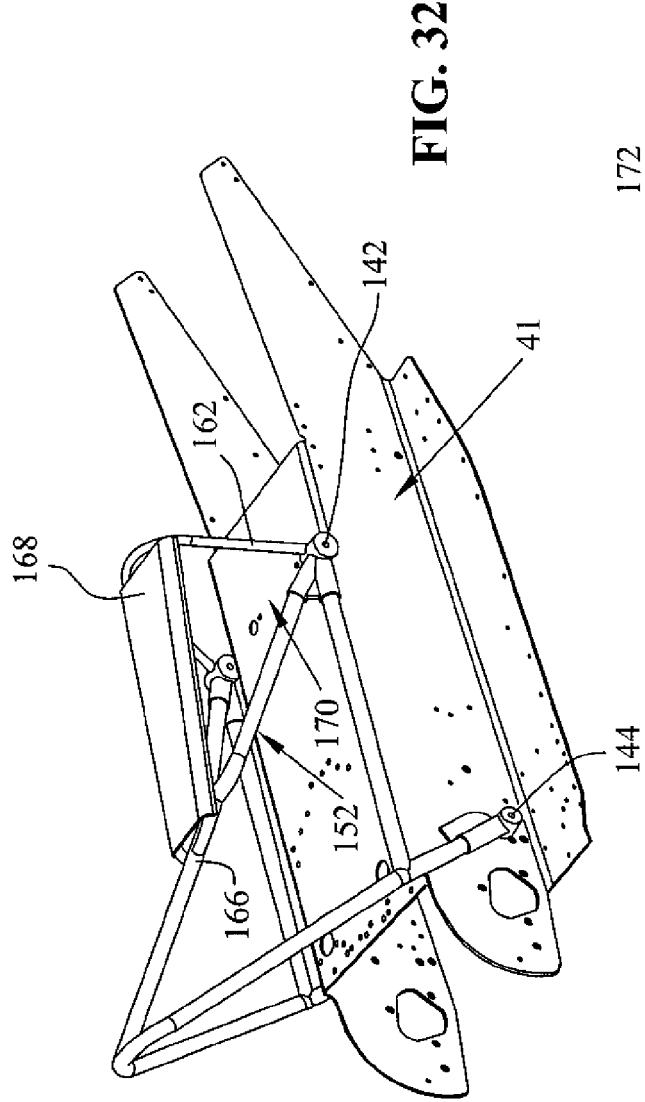
FIG. 32 shows a seat bun mounted on the seat frame of FIG. 31.

The subframe also makes for a logical attachment for a snowmobile seat. By integrating a type of seat frame into this structure, as shown in FIGS. 31 and 32, rider input is also more efficiently directed into the durable portion of the rear structure. In the embodiment of FIGS. 31 and 32, a snowmobile seat includes a mounting frame 161 supported by the existing structure of sub frame 160. A seat bun 168 attaches to this frame 161.

With reference still to FIGS. 31 and 32, a U-shaped arm 162 has opposite ends coupled to rear suspension pivot connectors 142 so that the U-shaped arm 162 extends upwardly above the tunnel 41 as shown in FIG. 32. First and second seat mount frame arms 164 and 166 extend between the U-shaped arm 162 and arm 150. A seat bun 168 is then coupled to arms 164 and 166. This structure provides an open region 170 below seat bun 168 for storage.

Figure 33:
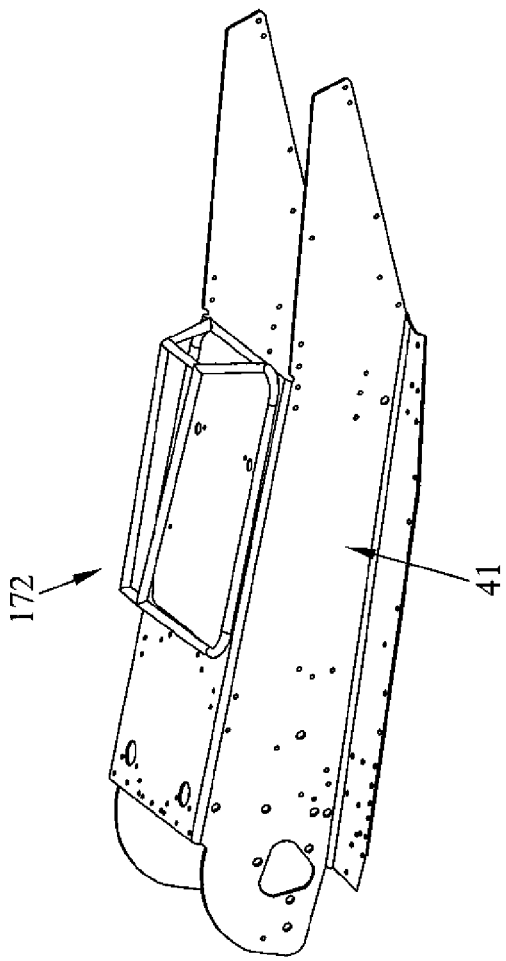
FIG. 33 shows an alternate tunnel mounted seat frame.
Figure 34:
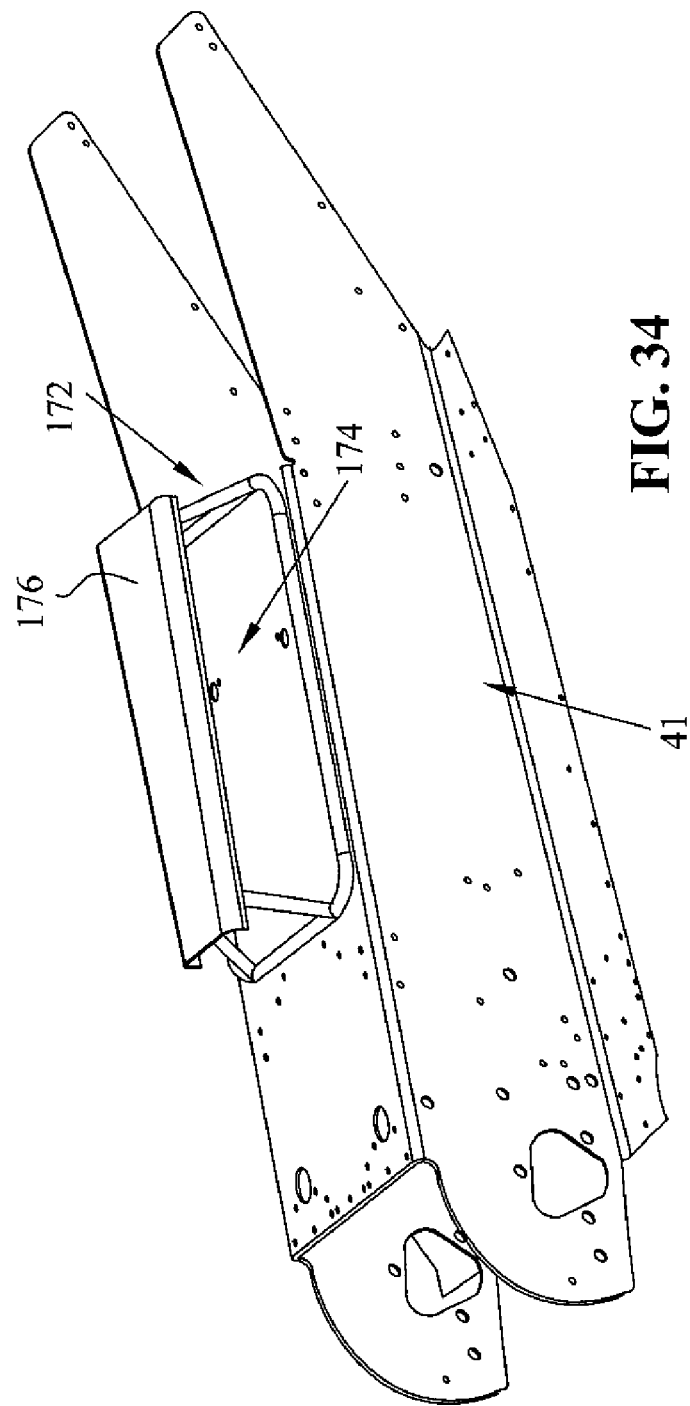
FIG. 34 shows a seat bun mounted on the seat frame of FIG. 33.

FIGS. 33 and 34 show an alternative embodiment of a seat mount frame 172 mounted to an existing tunnel frame 41 by welding or suitable fasteners. This embodiment provides an open region 174 beneath a seat bun 176 as shown in FIG. 34.

Modern snowmobile seats rely on a plastic bun to attach to the snowmobile, often using the gas tank to help add support to the seat. This restricts under seat room, limits how thin a seat can be, and relies on plastic to hold up to loads created by a rider. The seat bun geometry is constrained to be adequately strong, limiting how narrow it can be. A two piece mounting system would prove stronger, allow more room, and could be thinner.

Regardless of means of attachment, the seat mount frame transmits load from rider to existing chassis structure. The primary function of the seat bun is to secure the seat padding and cover to the mount frame, where as modern plastic seat buns also transmit load to the chassis.

Figure 25:
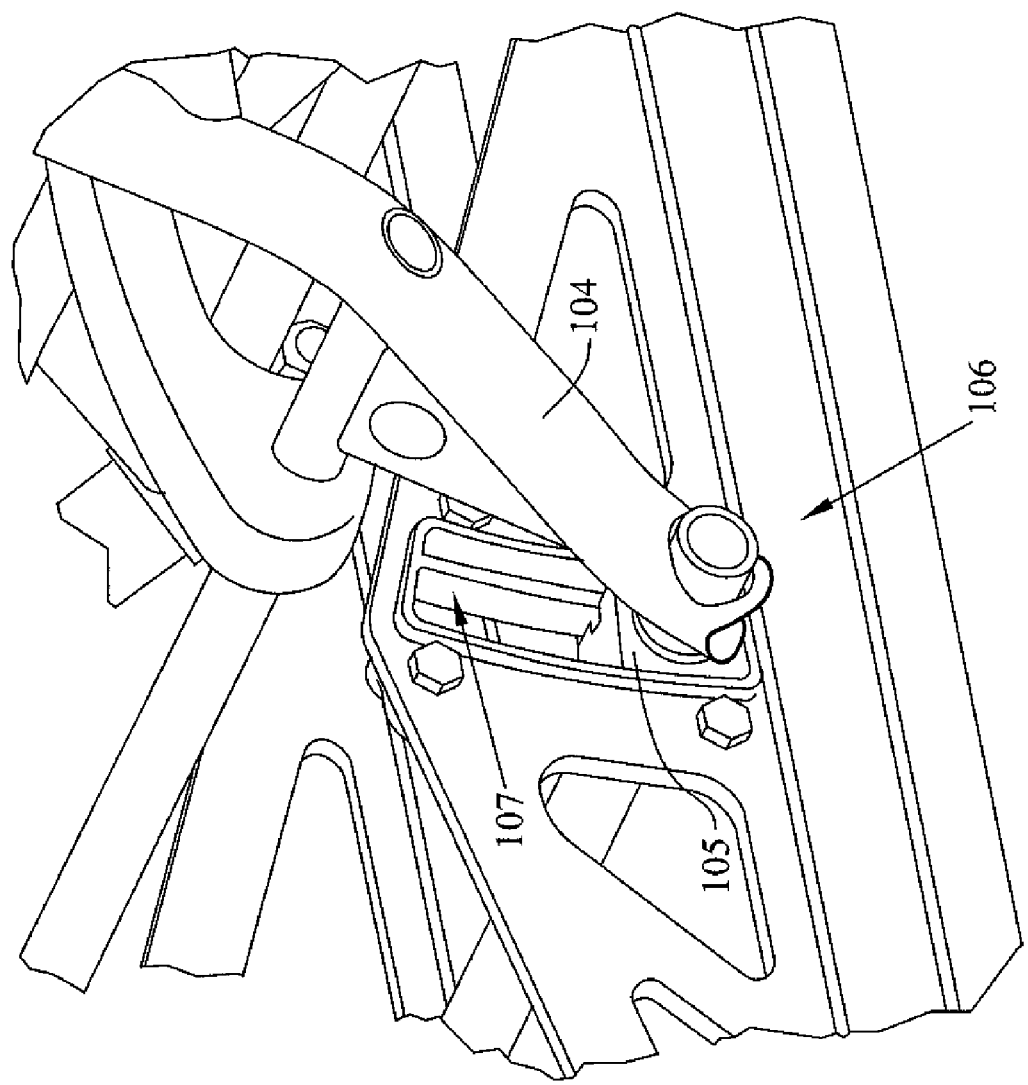
FIG. 25 shows an enlarged perspective view showing the pivotal sliding coupling connection of the rear suspension mounts to the slide rails.

The illustrated design features of the architecture of the rear suspension disclosed herein are summarized as follows: the main shock and damper (LFE 32) are mounted above the track 39 and above the tunnel 40 and react on the chassis. The chassis structure disclosed with reference to FIGS. 27-32 facilitate the over tunnel LFE design. At least one suspension arm mounts to the chassis above the track, and the track passes through at least one suspension component. In other words, at least one component "wraps" around the track. The suspension 60 does not have a carrier wheel which yields a triangular track wrap path. Sliders and bumpers are used to control the track direction, but these are not normally in contact with the track. Swing arm 80 mounts to the chassis coaxial with the drive shaft 86. Track 39 and drive shaft 86 are part of the suspension subsystem. They are installed and removed from the vehicle as one unit. A slider slot 107 is used to control the relative angle of the pivot 96 to the slide rail 12 as shown in FIG. 24. A block 105 coupled to arm 104 moves back and forth in slot 107. This controls both front-to-rear and rear-to-front coupling. More simple bumpers may be used on the slide rail instead of a slot 107, but the slot 107 offers lateral and longitudinal stiffness. A deflector shield 110 is mounted to idler wheel assembly 108 as shown in FIGS. 18 and 25. By mounting directly to this assembly only, the shield 110 moves with the idler wheel 108 when setting track tension. The vertical difference between the front and rear arm chassis mounts is illustratively 20% or more of the chassis link length (D). Finally, A/B ratio of links A and B is illustratively 1.6 to 2.0 or greater.

What is claimed is:

1. A snowmobile, comprising:
   a chassis comprised of a tunnel and a subframe, the subframe being structurally and fixedly mounted to the tunnel;
   slide rails;
   endless track coupled to the slide rails;
   at least one front linkage operatively connecting the slide rails to one of the tunnel or the subframe; and
   at least one rear linkage operatively connecting the slide rails to the tunnel.

2. The snowmobile of claim 1, wherein at least one linear force element (LFE) is positioned between the chassis and the rear linkage.

3. The snowmobile of claim 2, wherein the at least one LFE is positioned outside of an envelope defined by the endless track.

4. The snowmobile of claim 3, wherein the at least one LFE is positioned above the tunnel.

5. The snowmobile of claim 4, wherein the chassis is comprised of framing attached to the exterior of the tunnel, and comprises a central bracket to which one end of the LFE is attached.

6. The snowmobile of claim 5, further comprising a drive shaft mounted transversely through the tunnel, and wherein the front linkage is attached to the tunnel, at a position coaxial with the drive shaft.

7. The snowmobile of claim 6, wherein the chassis further comprises load arms directing forces along a load path which are coincident with a rotational axis of the drive shaft.

8. The snowmobile of claim 1, wherein the chassis further comprises tubes attached to and straddling the tunnel, the tubes extending substantially vertically.

9. The snowmobile of claim 8, wherein the tubes define a steering hoop.

10. The snowmobile of claim 1, wherein the chassis further comprises a seat mount frame.

11. The snowmobile of claim 1, comprising two front linkages, each linkage connecting one slide rail to one of the tunnel or chassis, the front linkages being interconnected to the slide rails by a clevis which straddles the slide rails.

12. The snowmobile of claim 1, further comprising at least one linear force element (LFE) positioned above the endless track.

13. The snowmobile of claim 12, further comprising a seat mounted above the LFE.

14. The snowmobile of claim 12, wherein the at least one linear force element (LFE) is positioned intermediate the subframe and the rear linkage.

15. A snowmobile, comprising:
a chassis comprising:
   a tunnel having a top wall and side walls extending downwardly from the top wall; and
   a subframe at least partially overlapping, and being coupled to, the tunnel;
slide rails;
endless track coupled to the slide rails;
at least one front linkage operatively connecting the slide rails to the chassis; and
at least one rear linkage operatively connecting the slide rails to the chassis.

16. The snowmobile of claim 15, wherein at least one linear force element (LFE) is positioned between the chassis and the rear linkage.

17. The snowmobile of claim 16, wherein the at least one LFE is positioned outside of an envelope defined by the endless track.

18. The snowmobile of claim 17, wherein the at least one LFE is positioned above the tunnel.

19. The snowmobile of claim 15, wherein the subframe is comprised of framing attached to the exterior of the tunnel, and comprises a central bracket to which one end of the LFE is attached.

20. The snowmobile of claim 19, wherein the subframe is comprised of a plurality of frame tubes attached to an exterior of the tunnel.

21. The snowmobile of claim 20, further comprising a drive shaft mounted transversely through the tunnel, and wherein the front linkage is attached to the tunnel, at a position coaxial with the drive shaft.

22. The snowmobile of claim 21, wherein the subframe further comprises load arms directing forces along a load path which are coincident with a rotational axis of the drive shaft.

23. The snowmobile of claim 15, wherein the chassis further comprises tubes attached to and straddling the tunnel, the tubes extending substantially vertically.

24. The snowmobile of claim 23, wherein the tubes define a steering hoop.

25. The snowmobile of claim 15, further comprising at least one linear force element (LFE) positioned above the endless track.

26. The snowmobile of claim 25, wherein the at least one LFE is positioned intermediate the subframe and the rear linkage.

* * * * *